(12) United States Patent
Chang et al.

(10) Patent No.: US 10,681,768 B2
(45) Date of Patent: Jun. 9, 2020

(54) COMMUNICATION METHOD AND DEVICE

(71) Applicant: Huawei Technologies Co., Ltd., Shenzhen (CN)

(72) Inventors: Junren Chang, Beijing (CN); Shulan Feng, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/023,333

(22) Filed: Jun. 29, 2018

(65) Prior Publication Data

US 2018/0317275 A1 Nov. 1, 2018

Related U.S. Application Data

(63) Continuation of application No. PCT/CN2015/100049, filed on Dec. 31, 2015.

(51) Int. Cl.
*H04W 76/27* (2018.01)
*H04W 36/30* (2009.01)
*H04L 9/08* (2006.01)
*H04J 11/00* (2006.01)
*H04W 24/10* (2009.01)

(52) U.S. Cl.
CPC ......... *H04W 76/27* (2018.02); *H04J 11/0083* (2013.01); *H04J 11/0086* (2013.01); *H04J 11/0089* (2013.01); *H04L 9/08* (2013.01); *H04W 36/30* (2013.01); *H04W 24/10* (2013.01); *Y02D 70/126* (2018.01); *Y02D 70/1224* (2018.01); *Y02D 70/1242* (2018.01); *Y02D 70/1262* (2018.01); *Y02D 70/142* (2018.01); *Y02D 70/144* (2018.01); *Y02D 70/20* (2018.01); *Y02D 70/26* (2018.01)

(58) Field of Classification Search
CPC ... H04W 76/27; H04W 36/30; H04J 11/0086; H04J 11/0089; H04J 11/0083; H04L 9/08
See application file for complete search history.

(56) References Cited

U.S. PATENT DOCUMENTS

2001/0029181 A1* 10/2001 Verkama ................ H04Q 7/20
2002/0151325 A1 10/2002 Fitton et al.
(Continued)

FOREIGN PATENT DOCUMENTS

| CN | 101385365 A | 3/2009 |
|---|---|---|
| CN | 104285454 A | 1/2015 |

(Continued)

OTHER PUBLICATIONS

CN/201580085113.9, Office Action, dated Oct. 25, 2019.

*Primary Examiner* — Ronald B Abelson
(74) *Attorney, Agent, or Firm* — Leydig, Voit & Mayer, Ltd.

(57) ABSTRACT

Embodiments of the present disclosure relate to the field of communications technologies, and in particular, to a communication method and a device. Second user equipment executes some tasks required for communication between first user equipment and a network device, and the first user equipment properly communicates with the second user equipment. In this way, energy consumption of the first user equipment required for communication with the network device can be reduced, thereby prolonging a standby time and improving user experience.

13 Claims, 11 Drawing Sheets

(56) References Cited

U.S. PATENT DOCUMENTS

| | | | |
|---|---|---|---|
| 2002/0168992 A1* | 11/2002 | Eiden | H04B 7/00 |
| 2005/0176437 A1* | 8/2005 | Mir | H04Q 7/20 |
| 2005/0192034 A1* | 9/2005 | Munje | H04Q 7/20 |
| 2007/0183374 A1 | 8/2007 | Classon et al. | |
| 2011/0134832 A1 | 6/2011 | Soliman | |
| 2013/0077541 A1* | 3/2013 | Lin | H04W 72/0413 |
| 2013/0130684 A1 | 5/2013 | Gomes et al. | |
| 2013/0188547 A1* | 7/2013 | Moriwaki | H04W 72/00 |
| 2013/0322413 A1* | 12/2013 | Pelletier | H04W 72/1289 |
| 2015/0131636 A1 | 5/2015 | Tanaka | |
| 2015/0134732 A1* | 5/2015 | Cho | H04L 29/08 |
| 2016/0335651 A1* | 11/2016 | Tan et al. | G06Q 30/0207 |
| 2016/0381720 A1* | 12/2016 | Baek | H04W 76/02 |
| 2017/0150337 A1* | 5/2017 | Bareket | H04W 8/00 |
| 2017/0332432 A9 | 11/2017 | Wang et al. | |

FOREIGN PATENT DOCUMENTS

| | | |
|---|---|---|
| JP | 2002335255 A | 11/2002 |
| JP | 2013513308 A | 4/2013 |
| JP | 2013529409 A | 7/2013 |
| WO | 2014016944 A1 | 1/2014 |
| WO | 2014101079 A1 | 7/2014 |
| WO | 2014201702 A1 | 12/2014 |
| WO | 2015059286 A1 | 4/2015 |
| WO | 2015190992 A1 | 12/2015 |

* cited by examiner

COMMUNICATION METHOD AND DEVICE

CROSS-REFERENCE TO RELATED APPLICATIONS

This application is a continuation of International Application No. PCT/CN2015/100049, filed on Dec. 31, 2015, the disclosure of which is hereby incorporated by reference in its entirety.

TECHNICAL FIELD

The present disclosure relates to the field of communications technologies, and in particular, to a communication method and a device.

BACKGROUND

With development of communications technologies, various types of user terminals emerge. Wearable devices are widely applied because the wearable devices have a small size and are convenient to carry, for example, products such as a watch and a wrist strap supported by a wrist, shoes and socks supported by feet or other products worn on legs, glasses, a helmet, a headband, and the like supported by a head, and products in various forms such as smart clothes, smart school bags, smart canes, and smart accessories.

Wearable devices are becoming multifunctional and portable. Therefore, most wearable devices can support application software and a mobile communication function. For example, some wearable devices support a subscriber identity module (SIM) card.

However, most wearable devices have a relatively small size, and can carry a battery of a limited size. Therefore, a wearable device usually has a relatively short battery standby time. However, application software and a communication function both need support of a relatively large quantity of electricity. As a result, if these functions are started, power consumption is increased. Consequently, the battery standby time of the wearable device is shorter, and practicality is reduced.

SUMMARY

Embodiments of the present disclosure provide a communication method and a device. According to the embodiments of the present disclosure, a standby time of a user equipment can become longer, and practicability is improved.

According to an aspect, an embodiment of this application provides a communication method, where the method includes: determining, by a first user equipment, to obtain, by executing a first task by using a second user equipment, a first result required for communication with a network device, where the first result may include at least one piece of the following information: paging information, information about a cell to be camped on or a serving cell, a serving cell measurement result, a neighboring cell measurement result, system information or updated system information of a cell to be camped on or a serving cell, information about a cell to be camped on or a serving cell that is obtained after cell selection or cell reselection, uplink transmit power information or uplink transmit power adjustment information used in a serving cell, or uplink timing advance information or uplink advance adjustment information used in a serving cell; receiving, by the first user equipment, the first result sent by the second user equipment, where the first result is obtained by the second user equipment by executing the first task; and communicating, by the first user equipment, with the network device by using the first result obtained from the second user equipment. By using this embodiment of the present disclosure, the first user equipment may obtain, by using the second user equipment, information required for communication with the network device, and does not need to constantly execute the first task, so that energy consumption is reduced. In addition, because energy consumed by the first user equipment to communicate with the second user equipment is less than energy required by the first user equipment to communicate with the network device, energy can be further saved.

In a possible design, the first task may include one or more of the following tasks: cell search, cell measurement, cell selection, cell reselection, cell system information listening, cell paging message listening, cell paging message reception, determining uplink transmit power information or uplink transmit power adjustment information used in a serving cell, determining uplink timing advance information or uplink advance adjustment information used in a serving cell, determining a tracking area, determining to update a tracking area, or the like. In this manner, the first user equipment may not execute the foregoing tasks, thereby saving energy.

In a possible design, the method further includes: executing, by the first user equipment, only a second task, where the second task may include tasks other than the first task in the following tasks: cell search, cell measurement, cell selection, cell reselection, cell system information change listening, cell system information reception, cell paging message listening, cell paging message reception, determining uplink transmit power information or uplink transmit power adjustment information used in a serving cell, determining uplink timing advance information or uplink advance adjustment information used in a serving cell, determining a tracking area, and determining to update a tracking area. Because all the foregoing tasks need to be executed in a process of communication between the first user equipment and the network device, energy consumption may be reduced if some tasks are given to the second user equipment for execution.

In a possible design, before the first user equipment executes the first task by using the second user equipment, the method may further include: receiving, by the first user equipment, first indication information sent by the second user equipment or the network device, where the first indication information is used to instruct to execute the second task. By using this embodiment of the present disclosure, the first user equipment may stop or skip executing the first task only under a particular instruction, so as to prevent repeated execution of a task or prevent the first user equipment from being idle, and ensure normal communication.

In a possible design, the method further includes: storing, by the first user equipment, the first result, so that the first user equipment obtains the stored first result when the first user equipment needs to communicate with the network device. When the first user equipment receives the first result sent by the second user equipment, the first user equipment may not need to communicate with the network device. Therefore, the first user equipment may first store the first result, and when the first user equipment needs to perform communication, performs communication by using the stored first result.

In a possible design, before the receiving the first result, the method may further include: sending, by the first user equipment, a first request message to the second user equipment, where the first request message is used to request the first result. The first user equipment may obtain the first result from the second user equipment when the first user equipment needs to perform communication. In this way, unnecessary communication may be avoided, communication efficiency may be improved, and energy consumption may be reduced.

In a possible design, the communicating, by the first user equipment, with the network device by using the first result includes: establishing, by the first user equipment, a direct connection to the network device by using the first result, to perform communication; or indirectly communicating, by the first user equipment, with the network device by using the first result and the second user equipment. To avoid direct communication between the first user equipment and the network device and reduce energy consumption, data in a communication process may also be transmitted by using the second user equipment.

In a possible design, the method further includes: receiving, by the first user equipment, a group establishment acknowledgment message sent by the second user equipment, where the group establishment acknowledgment message is used to indicate that a group is established between the first user equipment and the second user equipment. The method may be implemented by establishing a group. In this way, communication between the first user equipment, the second user equipment, and the network device may be performed based on the group, so that a task is more explicit.

In a possible design, before a group is established, the method further includes: sending, by the first user equipment, a second request message to the second user equipment, where the second request message is used to request to establish the group between the first user equipment and the second user equipment. A group establishment request may be triggered by the first user equipment, for example, triggered by an application of the first user equipment, or triggered when there is a need to establish a group. In this way, a group may be established when there is a need, thereby saving resources.

In a possible design, the method further includes: receiving, by the first user equipment, a paging message sent by the second user equipment, where a paging object of the paging message is the first user equipment; or receiving, by the first user equipment, a part or all of content of a paging message sent by the second user equipment, where the paging message is sent by the network device and received by the second user equipment; or receiving, by the first user equipment, a service notification message sent by the second user equipment, where the service notification message is determined by the second user equipment according to a received paging message sent by the network device. By using this embodiment of the present disclosure, paging of the first user equipment performed by the network device may also be received by the second user equipment. In this way, energy consumption may be further reduced.

In a possible design, the method further includes: determining, by the first user equipment, to release the group when a preset condition is met. A group is established on a basis that short-range communication can be performed between the first user equipment and the second user equipment, or that there is a need to establish a group. Therefore, when the preset condition is met, the group may be released, and resources occupied by the group are released, so that group establishment is more flexible.

In a possible design, that the preset condition is met includes: quality of a signal or a distance between the first user equipment and the second user equipment reaches a threshold; or the first user equipment receives group release indication information sent by the second user equipment or the network device; or the first user equipment receives group release indication information by using a man-machine interface or from an application layer. By using the present disclosure, the first user equipment, the second user equipment, and the network device all can trigger group release, so that group establishment and release are more flexible, and user experience is better.

In a possible design, the method further includes: after releasing the group, starting or restarting, by the first user equipment, to execute the first task, or continuing, by the first user equipment, to camp on a current serving cell. After the group is released, that is, the second user equipment no longer executes the first task in place of the first user equipment, the first user equipment may further establish a group with other user equipments, or independently execute the first task. If the first user equipment is in a camp state, the first user equipment may continue to camp on a cell selected or reselected by using the second user equipment. Therefore, group establishment is more flexible, and also can be adapted to various cases, thereby improving practicability.

In a possible design, before releasing the group, the method may further include: sending, by the first user equipment, a third request message to the second user equipment, where the third request message is used to instruct to release the group between the first user equipment and the second user equipment. By using this embodiment of the present disclosure, group release may be triggered by the first user equipment.

In a possible design, in a group release process, the method further includes: notifying, by the first user equipment, the second user equipment whether the first user equipment continues, after the group is released, to be in a same cell or a same tracking area as the second user equipment. After the group is released, information such as a cell and a tracking area may be redetermined. In this case, the first user equipment may give an indication. Therefore, after the group is released, the network device knows a location of and information about the first user equipment, thereby ensuring normal communication.

According to another aspect, an embodiment of this application provides a communication method, where the method may include: executing, by second user equipment, a first task to obtain a first result required for communication with a network device, where the first result includes at least one piece of the following information: paging information, information about a cell to be camped on or a serving cell, a serving cell measurement result, a neighboring cell measurement result, system information or updated system information of a cell to be camped on or a serving cell, information about a cell to be camped on or a serving cell that is obtained after cell selection or cell reselection, uplink transmit power information or uplink transmit power adjustment information of a serving cell, or uplink timing advance information or uplink advance adjustment information of a serving cell; and sending, by the second user equipment, the first result to first user equipment. The first user equipment may communicate with the network device by using the first result. By using this embodiment of the present disclosure, the first user equipment may obtain, by using the second user equipment, information required for communication with the network device, and does not need to constantly execute the first task, so that energy consumption is reduced. In addition, because energy consumed by the first user equipment to communicate with the second user equipment is less than energy required by the first user equipment to communicate with the network device, energy can be further saved.

In a possible design, the executing, by second user equipment, a first task to obtain a first result includes at least one of the following: performing, by the second user equipment, cell measurement, and obtaining a serving cell measurement result and/or a neighboring cell measurement result; performing, by the second user equipment, cell selection or cell reselection, and determining information about a selected or reselected cell; listening to, by the second user equipment, system information of a cell to be camped on or a serving cell, and determining changed system information of the cell to be camped on or the serving cell when the system information of the cell to be camped on or the serving cell changes; or listening to, by the second user equipment, a paging message, and determining that a paging message whose paging object is the first user equipment is obtained by means of listening. The method further includes: sending, by the second user equipment, a fourth request message to the network device, where the fourth request message is used to obtain parameter information required for a service provided by the network device; and receiving, by the second user equipment, a first response message sent by the network device, where the first response message includes the parameter information, the parameter information includes at least one of uplink transmit power information or uplink transmit power adjustment information, uplink timing advance information or uplink advance adjustment information, or a configuration parameter, and the configuration parameter includes at least one of the following parameters: a physical layer configuration parameter, a media access control MAC layer configuration parameter, a radio link control RLC layer configuration parameter, a Packet Data Convergence Protocol PDCP layer configuration parameter, or a radio resource control RRC configuration parameter. The second user equipment executes any one or more of the foregoing tasks in place of the first user equipment, so that energy consumption required by the first user equipment to independently execute these tasks can be reduced, thereby prolonging a standby time.

In a possible design, before the sending, by the second user equipment, the first result to first user equipment, the method may further include: receiving, by the second user equipment, a first request message sent by the first user equipment, where the first request message is used to request the first result. Therefore, the first user equipment may obtain the first result from the second user equipment when the first user equipment needs to perform communication. In this way, unnecessary communication may be avoided, communication efficiency may be improved, and energy consumption may be reduced.

In a possible design, the method further includes: determining, by the second user equipment, to establish a group between the first user equipment and the second user equipment, where the group indicates that the first user equipment and the second user equipment may share at least one piece of information used for communication with the network device; and sending, by the second user equipment, a group establishment acknowledgment message to the first user equipment, to indicate that the group is established between the first user equipment and the second user equipment. The method may be implemented by establishing a group. In this way, communication between the first user equipment, the second user equipment, and the network device may be performed based on the group, so that a task is more explicit.

In a possible design, the determining, by the second user equipment, to establish a group between the first user equipment and the second user equipment may include: sending, by the second user equipment, a group establishment request message to the network device, where the group establishment request message includes information about the group, so that the network device establishes the group according to the group establishment request message; and receiving, by the second user equipment, a group establishment acknowledgment message sent by the network device. A specific group may be established by the network device. In this way, it may be ensured that the first user equipment, the second user equipment, and the network device all know a group relationship.

In a possible design, the group indicates that the first user equipment and the second user equipment may share at least one piece of the following information: information about a cell to be camped on or a serving cell, a serving cell measurement result, a neighboring cell measurement result, system information or updated system information of a cell to be camped on or a serving cell, information about a cell to be camped on or a serving cell that is obtained after cell selection or cell reselection, uplink transmit power information or uplink transmit power adjustment information used in a serving cell, or uplink timing advance information or uplink advance adjustment information used in a serving cell. By sharing the foregoing information, the first user equipment may obtain the foregoing shared information by using the second user equipment, thereby saving energy.

In a possible design, the method further includes: sending, by the second user equipment, the information about the group to the network device, to notify the network device that the first user equipment and the second user equipment are in one group. The group may be alternatively established by the second user equipment, and the second user equipment notifies the network device of the group after establishing the group.

In a possible design, the method may further include: receiving, by the second user equipment, a group establishment request message sent by the first user equipment, or determining, by the second user equipment, that a group needs to be established between the first user equipment and the second user equipment. When establishing the group, the second user equipment may establish the group under an instruction of the first user equipment or the network device.

In a possible design, the information about the group may include any one or more of a group-specific identifier, an identifier of the first user equipment, or an identifier of the second user equipment. The group-specific identifier may be generated by the second user equipment or the network device. In this way, a corresponding device or group may be found based on a corresponding identifier.

In a possible design, the listening to, by the second user equipment, a paging message, and determining that a paging message whose paging object is the first user equipment is obtained by means of listening may include: receiving, by the second user equipment, a paging message sent by the network device, where the paging message includes the group information of the group, or the paging message includes the identifier of the first user equipment, or the paging message includes the identifier of the first user equipment and an indication indicating whether to perform a group operation, or the paging message includes the identifier of the first user equipment and an indication indicating whether to forward the paging message to the first user equipment, or the paging message includes the identifier of the first user equipment and the identifier of the second user equipment. In the foregoing manner, it may be determined whether the paging message is paging whose paging object is the group, so that it is possible for the second user equipment to receive the paging message in place of the first user equipment. Therefore, energy consumption of the first user equipment is further reduced.

In a possible design, the determining, by the second user equipment, that a paging message whose paging object is the first user equipment is obtained by means of listening further includes: forwarding, by the second user equipment, the paging message to the first user equipment; or sending, by the second user equipment, a part or all of content of the paging message to the first user equipment; or sending, by the second user equipment, a service notification message to the first user equipment, where the service notification message is determined by the second user equipment according to the received paging message sent by the network device. Because a part of the content of the paging message received by the second user equipment may be only for the second user equipment, resources required when data is transmitted may be reduced in the foregoing manner.

In a possible design, the method further includes: releasing, by the second user equipment, the group when a preset condition is met. A group is established on a basis that short-range communication can be performed between the first user equipment and the second user equipment, or that there is a need to establish a group. Therefore, when the preset condition is met, the group may be released, and resources occupied by the group are released, so that group establishment is more flexible.

In a possible design, that the preset condition is met may include: quality of a signal or a distance between the first user equipment and the second user equipment reaches a threshold; or the second user equipment receives group release indication information sent by the first user equipment or the network device; or the second user equipment receives group release indication information by using a man-machine interface or from an application layer. By using the present disclosure, it may be properly implemented that the first user equipment, the second user equipment, and the network device all can trigger group release, so that group establishment and release are more flexible, and user experience is better.

In a possible design, the releasing, by the second user equipment, the group includes: sending, by the second user equipment, group release indication information to the network device, where the group release indication information is used to instruct to release the group between the first user equipment and the second user equipment. By using this embodiment of the present disclosure, the network device may also release a corresponding group, and may delete information about the group if only the information about the group is stored.

In a possible design, the sending, by the second user equipment, group release indication information to the network device may include:

performing, by the second user equipment, a process of randomly accessing the network device or a location update process; and sending, by the second user equipment, the group release indication information to the network device in the random access process or the location update process.

In a possible design, the group release indication information sent by the second user equipment to the network device includes indication information indicating whether the first user equipment and the second user equipment continue to be in a same cell and/or a same tracking area. After the group is released, that is, the second user equipment no longer executes the first task in place of the first user equipment, the first user equipment may further establish a group with other user equipment, or independently execute the first task. If the first user equipment is in a camp state, the first user equipment may continue to camp on a cell selected or reselected by using the second user equipment. Therefore, group establishment is more flexible, and also can be adapted to various cases, thereby improving practicability.

In a possible design, the second user equipment receives group release indication information sent by the first user equipment, where the group release indication information includes indication information indicating whether the first user equipment and the second user equipment continue to be in a same cell and/or a same tracking area.

According to still another aspect, an embodiment of this application provides a communication method, where the method may include: receiving, by an access network device, indication information that is of a correspondence between first user equipment and second user equipment and that is sent by the second user equipment, where the correspondence means that the first user equipment obtains, by executing a first task by using the second user equipment, a first result required for communication with a network device, and the first result may include at least one piece of the following information: paging information, information about a cell to be camped on or a serving cell, a serving cell measurement result, a neighboring cell measurement result, system information or updated system information of a cell to be camped on or a serving cell, information about a cell to be camped on or a serving cell that is obtained after cell selection or cell reselection, uplink transmit power information or uplink transmit power adjustment information used in a serving cell, or uplink timing advance information or uplink advance adjustment information used in a serving cell; and determining, by the access network device based on the correspondence, that the second user equipment executes the first task. By using this embodiment of the present disclosure, the first user equipment may obtain, by using the second user equipment, information required for communication with the network device, and does not need to constantly execute the first task, so that energy consumption is reduced. In addition, because energy consumed by the first user equipment to communicate with the second user equipment is less than energy required by the first user equipment to communicate with the network device, energy can be further saved. The network device includes the access network device.

In a possible design, the indication information of the correspondence includes information about a group, where the information about the group is used to indicate that a group is established between the first user equipment and the second user equipment, and the group indicates that the first user equipment obtains, by executing the first task by using the second user equipment, the first result required for communication with the network device. The method may be implemented by establishing a group. In this way, communication between the first user equipment, the second user equipment, and the network device may be performed based on the group, so that a task is more explicit.

In a possible design, that the access network device determines the correspondence between the first user equipment and the second user equipment includes: receiving, by the access network device, a group establishment request message sent by the second user equipment, where the group establishment request message carries information about a group, the information about the group includes an identifier of the first user equipment and an identifier of the second user equipment, and the group establishment request message is used to instruct to establish the group between the first user equipment and the second user equipment. The group may be established by the network device, and may be specifically established by the access network device. Data required for establishing the group may be provided by the second user equipment.

In a possible design, before the group is established, the method may further include: establishing, by the access network device, the group between the first user equipment and the second user equipment according to the group establishment request message, and generating an identifier of the group.

In a possible design, the method further includes: sending, by the access network device, a group establishment acknowledgment message to the second user equipment, where the group establishment acknowledgment message is used to indicate that the access network device agrees to establish the group.

In a possible design, the determining, by the access network device based on the correspondence, that the second user equipment executes the first task may include: when the access network device needs to send a paging message whose paging object is the first user equipment, sending, by the access network device, the paging message to the second user equipment according to the correspondence information. In the foregoing manner, it may be determined whether the paging message is paging whose paging object is the group, so that it is possible for the second user equipment to receive the paging message in place of the first user equipment. Therefore, energy consumption of the first user equipment is further reduced.

In a possible design, the paging message sent to the second user equipment includes the information about the group, or the paging message includes the identifier of the first user equipment, or the paging message sent to the second user equipment includes the identifier of the first user equipment and an indication indicating whether to perform a group operation, or the paging message includes the identifier of the first user equipment and an indication indicating whether to forward the paging message to the first user equipment, or the paging message includes the identifier of the first user equipment and the identifier of the second user equipment.

In a possible design, the method further includes: sending, by the access network device, the information about the group to a core network device. The network device may include the access network device and the core network device, and the group may be established by the core network device or may be notified to the core network device.

According to yet another aspect, an embodiment of this application provides a communication method, where the method may include: determining, by a core network device, a correspondence between first user equipment and second user equipment, where the correspondence means that the first user equipment obtains, by executing a first task by using the second user equipment, a first result required for communication with a network device, and the network device includes the core network device and an access network device; and communicating, by the core network device, with the first user equipment based on the correspondence. By using the method, in a communication process, the first user equipment may obtain, by using the second user equipment, information required for communication with the network device, and does not need to constantly execute the first task, so that energy consumption is reduced. In addition, because energy consumed by the first user equipment to communicate with the second user equipment is less than energy required by the first user equipment to communicate with the network device, energy can be further saved. The network device may include the core network device.

In a possible design, the determining, by a core network device, a correspondence between first user equipment and second user equipment includes: receiving, by the core network device, a group establishment request message sent by the access network device, where the group establishment request message carries information about a group, and the information about the group includes an identifier of the first user equipment and an identifier of the second user equipment; and establishing, by the core network device, a group between the first user equipment and the second user equipment according to the group establishment request message, and generating an identifier of the group. A process of establishing the group by the core network device may be implemented by using the method.

In a possible design, the method further includes: sending, by the core network device, a group establishment acknowledgment message to the access network device, where the group establishment acknowledgment message includes the identifier of the group. After establishing the group, the core network device may notify, by using the access network device, the first user equipment and the second user equipment of the group, so that the devices operate according to the group. Therefore, energy of the first user equipment is further saved.

In a possible design, the communicating, by the core network device, with the first user equipment based on the correspondence includes: when the core network device needs to send a paging message whose paging object is the first user equipment, sending, by the core network device, the paging message to the access network device according to the correspondence, and instructing the access network device to send the paging message to the second user equipment. In the foregoing manner, it may be determined whether the paging message is paging whose paging object is the group, so that it is possible for the second user equipment to receive the paging message in place of the first user equipment. Therefore, energy consumption of the first user equipment is further reduced.

According to yet another aspect, an embodiment of this application provides a communication method, where the method may include: establishing, by first user equipment, a connection to a network device; and executing, by the first user equipment, a third task by using or with the assistance of second user equipment, where the third task is a task required for communication between the first user equipment and the network device, and the third task includes at least one of the following: performing measurement according to measurement configuration information, sending a measurement result to the network device, or being handed over to a target cell or a target base station in a random access manner. By using this embodiment of the present disclosure, the first user equipment may execute a measurement task in a communication process by using the second user equipment, so that energy consumption of the first user equipment can be reduced, and a standby time can be prolonged.

In a possible design, the measurement configuration information includes radio resource management RRM measurement configuration information and/or channel state indication information CSI measurement configuration information. Proxy measurement of RRM measurement and/or CSI measurement may be implemented by using the method, so that energy consumption of the first user equipment is reduced.

In a possible design, the measurement configuration information includes first measurement configuration information and/or second measurement configuration information, the first measurement configuration information is configured by the network device for the first user equipment, and the second measurement configuration information is configured by the network device for the second user.

In a possible design, the method further includes: receiving, by the first user equipment, the first measurement configuration information and/or the second measurement configuration information sent by the second user equipment. After receiving the measurement configuration information, the second user equipment may send the measurement configuration information to the first user equipment, so that the first user equipment performs measurement according to the measurement configuration information when the first user equipment needs to independently perform measurement or verification.

In a possible design, the method further includes: receiving, by the first user equipment, a first measurement result sent by the second user equipment, where the first measurement result is obtained by the second user equipment by performing measurement according to the first measurement configuration information and/or the second measurement configuration information.

In a possible design, the method further includes: performing, by the first user equipment, measurement according to the first measurement configuration information and/or the second measurement configuration information, to obtain a second measurement result; and when a diffidence between the first measurement result and the second measurement result exceeds a preset threshold, notifying, by the first user equipment, the second user equipment that the diffidence between the first measurement result and the second measurement result exceeds the preset threshold, or instructing the second user equipment to cancel measurement performed according to the measurement configuration information, or notifying the second user equipment that the first user equipment starts to autonomously perform measurement; or sending, by the first user equipment, the second measurement result to the second user equipment periodically or in an event triggering manner, so that the second user equipment performs verification according to the second measurement result. By using this embodiment of the present disclosure, verification of proxy measurement may be implemented, so as to ensure that a result obtained by the second user equipment by performing measurement is closer to a result obtained by the first user equipment by performing measurement independently, and ensure that the first user equipment can perform normal communication.

In a possible design, the method further includes: receiving, by the first user equipment, handover information sent by the second user equipment, where the handover information includes information about the target cell, uplink timing advance information or uplink advance adjustment information used in the target cell, and/or uplink transmit power information or uplink transmit power adjustment information used in the target cell; and communicating, by the first user equipment, with the network device by using the handover information. By using this embodiment of the present disclosure, a handover operation may be performed on the second user equipment instead of the first user equipment, so that energy consumption of the first user equipment is reduced, and it can be ensured that the first user equipment can perform normal communication.

In a possible design, the method further includes: receiving, by the first user equipment, handover indication signaling sent by the network device or the second user equipment, where the handover indication signaling may be physical layer control signaling, MAC signaling, or RRC signaling; and directly accessing, by the first user equipment, the target cell or the target base station according to the handover indication signaling by using the handover information. Fast handover of the first user equipment may be implemented by using the method.

In a possible design, the method further includes: executing, by the first user equipment, a fourth task, where the fourth task may include at least one of the following: receiving downlink data directly sent by the network device, receiving downlink control signaling directly sent by the network device, directly sending scheduling request signaling to the network device, directly receiving secure activation-related signaling from a network side device, directly sending secure activation-related signaling to the network device, or directly feeding back CSI measurement result information to the network device. In consideration of security, the first user equipment may independently execute the foregoing tasks, to improve security of data communication.

In a possible design, the executing, by the first user equipment, a fourth task includes: executing, by the first user equipment, the fourth task to obtain a second result, where the second result includes HARQ information obtained by the first user equipment by decoding the downlink data or the downlink control signaling, and the HARQ information is information indicating whether the downlink data is correctly decoded; and directly feeding back, by the first user equipment, the HARQ information to the network device; or executing, by the first user equipment, the fourth task to obtain a second result, where the second result includes that the first user equipment determines that processing of the downlink control signaling or processing of the secure activation-related signaling is correctly completed; and directly feeding back, by the first user equipment to the network device, feedback information indicating whether processing of the downlink control signaling is completed. Because the first user equipment independently executes the foregoing tasks, security in a communication process may be improved, and communication may also be better ensured.

According to yet another aspect, an embodiment of this application provides a communication method, where the method may include: receiving, by second user equipment, measurement configuration information sent by a network device, where the measurement configuration information is used to execute a third task, and the third task is a task that is executed by the second user equipment in place of first user equipment and that is required for communication with the network device; and executing, by the second user equipment, the third task, where the third task may include at least one of the following: performing measurement according to the measurement configuration information, sending a measurement result to the network device, or performing a process of being handed over to a target base station in a random access manner. By using this embodiment of the present disclosure, the first user equipment may execute a measurement task in a communication process by using the second user equipment, so that energy consumption of the first user equipment can be reduced, and a standby time can be prolonged.

In a possible design, the method may further include: determining, by the second user equipment, that the first user equipment establishes a connection to the network device; or receiving, by the second user equipment, first indication information sent by the first user equipment or the network device, where the first indication information is used to request or instruct the second user equipment to execute the third task. In a possible design, the receiving, by second user equipment, measurement configuration information sent by a network device further includes: sending, by the second user equipment, a measurement configuration information obtaining request to the network device; and receiving, by the second user equipment, the measurement configuration information sent by the network device. By using this embodiment of the present disclosure, the measurement configuration information may be obtained.

In a possible design, the measurement configuration information may include radio resource management RRM measurement configuration information and/or channel state indication information CSI measurement configuration information. Proxy measurement of RRM measurement and/or CSI measurement may be implemented by using the method, so that energy consumption of the first user equipment is reduced.

In a possible design, the measurement configuration information includes first measurement configuration information and/or second measurement configuration information, the first measurement configuration information is configured by the network device for the first user equipment, and the second measurement configuration information is configured by the network device for the second user.

In a possible design, the measurement configuration information further includes second indication information, where the second indication information is used to indicate whether the first measurement configuration information can be used for the second user equipment, or indicate that the measurement configuration information includes the second measurement configuration information and indicate whether the second measurement configuration information can be used for the first user equipment. The second user equipment may operate according to an instruction, so that the first user equipment can normally communicate with the network device.

In a possible design, the performing measurement according to the measurement configuration information and/or the sending a measurement result to the network device include/includes: performing, by the second user equipment, measurement according to the first measurement configuration information and/or the second measurement configuration information, to obtain a first measurement result; and sending, by the second user equipment, the first measurement result to the network device. By using this embodiment of the present disclosure, a proxy measurement and feedback process may be implemented, so that power required in a communication process of the first user equipment is reduced, and a standby time is prolonged.

In a possible design, the performing, by the second user equipment, measurement according to the first measurement configuration information and/or the second measurement configuration information, to obtain a first measurement result may include: performing, by the second user equipment, comprehensive measurement according to the first measurement configuration information and the second measurement configuration information, to obtain the first measurement result; or performing, by the second user equipment, measurement according to the first measurement configuration information, to obtain the first measurement result.

In a possible design, the method further includes: sending, by the second user equipment, the measurement configuration information to the first user equipment. After receiving the measurement configuration information, the second user equipment may send the measurement configuration information to the first user equipment, so that the first user equipment performs measurement according to the measurement configuration information when the first user equipment needs to independently perform measurement or verification.

In a possible design, in a proxy measurement process, the method may further include: when the first measurement result meets a specific threshold, sending, by the second user equipment, the first measurement result to the first user equipment; or sending, by the second user equipment, the first measurement result to the first user equipment periodically or in an event triggering manner.

In a possible design, in a proxy measurement process, the method may further include: receiving, by the second user equipment, a second measurement result sent by the first user equipment, where the second measurement result is obtained by the first user equipment by performing measurement according to the first measurement configuration information and/or the second measurement configuration information; and when a difference between the first measurement result and the second measurement result exceeds a preset threshold, canceling, by the second user equipment, measurement performed according to the measurement configuration information in place of the first user equipment; or when a difference between the first measurement result and the second measurement result exceeds a preset threshold, notifying, by the second user equipment, the first user equipment that the difference between the first measurement result and the second measurement result exceeds the preset threshold, or instructing the first user equipment to autonomously perform measurement. By using this embodiment of the present disclosure, verification of proxy measurement may be implemented, so as to ensure that a result obtained by the second user equipment by performing measurement is closer to a result obtained by the first user equipment by performing measurement independently, and ensure that the first user equipment can perform normal communication.

In a possible design, that the difference between the first measurement result and the second measurement result exceeds the preset threshold may include the following implementation: the difference between the first measurement result and the second measurement result exceeds the preset threshold within a preset time period.

In a possible design, the executing, by the second user equipment, the third task, where the third task includes at least one of the following: performing measurement according to the measurement configuration information, sending a measurement result to the network device, or performing a process of being handed over to a target base station in a random access manner includes: receiving, by the second user equipment, a handover command sent by the network device, where the handover command includes information about a target cell; and being handed over, by the second user equipment, to the target cell according to the information about the target cell. By using this embodiment of the present disclosure, a handover operation may be performed on the second user equipment instead of the first user equipment, so that energy consumption of the first user equipment is reduced, and it can be ensured that the first user equipment can perform normal communication.

In a possible design, the network device includes a target access network device, the handover command further includes information about the target access network device, and the being handed over, by the second user equipment, to the target cell according to the information about the target cell includes: being handed over, by the second user equipment, to the target access network device according to the information about the target access network device and the information about the target cell.

In a possible design, the method further includes: sending, by the second user equipment to the target access network device, information about a group between the first user equipment and the second user equipment or information about a correspondence between the first user equipment and the second user equipment, where the group or the correspondence means that the first user equipment executes at least one of the following tasks by using the second user equipment: cell search, cell measurement, cell selection, cell reselection, cell system information change listening, cell system information reception, cell paging message listening, cell paging message reception, determining uplink transmit power information or uplink transmit power adjustment information used in a serving cell, determining uplink timing advance information or uplink advance adjustment information used in a serving cell, determining a tracking area, or determining to update a tracking area. By using this embodiment of the present disclosure, the target access network device may continue to communicate with the first user equipment by using the second user equipment, so that energy consumption of the first user equipment is reduced, and a standby time is prolonged.

In a possible design, the method may further include: obtaining, by the second user equipment, the information about the target cell and/or information about the target base station, uplink timing advance information or uplink advance adjustment information used in the target cell, and/or uplink transmit power information or uplink transmit power adjustment information used in the target cell; and sending, by the second user equipment, handover information to the first user equipment, where the handover information includes the information about the target cell and/or the information about the target base station, the uplink timing advance information or the uplink advance adjustment information used in the target cell, and/or the uplink transmit power information or the uplink transmit power adjustment information used in the target cell. By using this embodiment of the present disclosure, a handover operation may be performed on the second user equipment instead of the first user equipment, so that energy consumption of the first user equipment is reduced, and it can be ensured that the first user equipment can perform normal communication.

In a possible design, the sending, by the second user equipment, handover information to the first user equipment includes: sending, by the second user equipment, handover indication signaling to the first user equipment, where the handover indication signaling carries the handover information, to instruct the first user equipment to directly access the target cell or the target base station by using the handover information. Fast handover of the first user equipment may be implemented by using the method.

According to yet another aspect, an embodiment of this application provides a communication method, where the method may include: after an access network device establishes a connection to first user equipment, configuring, by the access network device, measurement configuration information required by second user equipment to execute a third task, where the third task is a task that is executed by the second user equipment in place of the first user equipment and that is required by the first user equipment to communicate with a network device; and sending, by the access network device, the measurement configuration information to the second user equipment, so that the second user equipment executes the third task according to the measurement configuration information, where the third task may include at least one of the following: performing measurement according to the measurement configuration information, sending a measurement result to the network device, or performing a process of being handed over to a target access network device in a random access manner. By using this embodiment of the present disclosure, the first user equipment may execute a measurement task in a communication process by using the second user equipment, so that energy consumption of the first user equipment can be reduced, and a standby time can be prolonged.

In a possible design, the sending, by the access network device, the measurement configuration information to the second user equipment may include: sending, by the access network device, indication information to the second user equipment, where the indication information is used to instruct the second user equipment to execute the third task, and the indication information may further carry the measurement configuration information. By using this embodiment of the present disclosure, the second user equipment may be notified of the measurement configuration information, and the second user equipment is instructed to start a proxy measurement process.

In a possible design, the method further includes: sending, by the access network device, indication information to the second user equipment, where the indication information is used to instruct the second user equipment to execute the third task according to the measurement configuration information. In this embodiment of the present disclosure, the indication information may be sent independently, and the measurement configuration information is sent to the second user equipment after the second user equipment determines to start a proxy measurement process.

In a possible design, the configuration information may include RRM measurement configuration information and/or CSI measurement configuration information. Proxy measurement of RRM measurement and/or CSI measurement may be implemented by using the method, so that energy consumption of the first user equipment is reduced.

In a possible design, the method further includes: sending, by the access network device, a first handover command to the second user equipment when determining that the first user equipment needs to be handed over to a target access network device or a target cell, where the first handover command includes information about the target access network device or the target cell. By using this embodiment of the present disclosure, a handover operation may be performed on the second user equipment instead of the first user equipment, so that energy consumption of the first user equipment is reduced, and it can be ensured that the first user equipment can perform normal communication.

In a possible design, the method further includes: sending, by the access network device, handover indication signaling to the first user equipment after determining that the second user equipment is handed over to the target access network device or the target cell, where the handover indication signaling is physical layer information, MAC signaling, or RRC signaling. Fast handover of the first user equipment may be implemented by using this embodiment of the present disclosure.

In a possible design, the handover indication signaling may further include any one or more of uplink timing advance information or uplink advance adjustment information that needs to be used by the first user equipment on the target access network device or in the target cell, or uplink transmit power information or uplink transmit power adjustment information that needs to be used by the first user equipment on the target access network device or in the target cell.

In a possible design, the method further includes: sending, by the access network device to the target access network device, information about a group between the first user equipment and the second user equipment or information about a correspondence between the first user equipment and the second user equipment, where the group or the correspondence means that the first user equipment executes at least one of the following tasks by using the second user equipment: cell search, cell measurement, cell selection, cell reselection, cell system information change listening, cell system information reception, cell paging message listening, cell paging message reception, determining uplink transmit power information or uplink transmit power adjustment information used in a serving cell, determining uplink timing advance information or uplink advance adjustment information used in a serving cell, determining a tracking area, or determining to update a tracking area. Fast handover of the first user equipment may be implemented by using the method.

According to yet another aspect, an embodiment of this application provides a communication method, where the method may include: establishing, by first user equipment, a connection to a network device; directly receiving, by the first user equipment, a security mode activation command sent by the network device; generating, by the first user equipment according to security context information, an encryption key and an integrity protection key for data transmission on a control plane and/or an encryption key for data transmission on a user plane; when the first user equipment performs data transmission with the network device, using the generated encryption key and integrity protection key for data transmission on the control plane and/or the generated encryption key for data transmission on the user plane; receiving, by the first user equipment, a key update message sent by second user equipment, where the key update message is sent by the network device to the second user equipment after the network device performs encryption and integrity protection on the key update message by using the encryption key and the integrity protection key; and updating, by the first user equipment according to the key update message, any one or more of the encryption key and the integrity protection key for data transmission on the control plane or the encryption key for data transmission on the user plane. By using this embodiment of the present disclosure, a security key between the first user equipment and the network device and a security key between the second user equipment and the network device may be independent of each other and invisible to each other, so as to ensure privacy of direct data transmission between the first user equipment and the network device. In addition, a key update process may be updated by using the second user equipment, so that energy consumption of the first user equipment is reduced, and a standby time is prolonged.

In a possible design, the generating, by the first user equipment according to security context information, an encryption key and an integrity protection key for data transmission on a control plane and/or an encryption key for data transmission on a user plane may include: generating, by the first user equipment, a first key according to the security context information; generating, by the first user equipment, a second key according to one or more of the first key, NAS COUNT information, an identifier of the network device, or an identifier of the second user equipment; calculating, by the first user equipment from the second key according to a security algorithm for the network device, the encryption key and the integrity protection key for data transmission on the control plane and/or the encryption key for data transmission on the user plane; and when the first user equipment performs data transmission with the network device, encrypting or decrypting data on the control plane by using the encryption key, performing integrity protection on the data on the control plane by using the integrity protection key or verifying integrity of the data on the control plane by using the integrity protection key, and/or decrypting or encrypting data on the user plane by using the encryption key.

According to yet another aspect, an embodiment of this application provides a communication method, where the method may include: establishing, by a network device, a connection to first user equipment; sending, by the network device, a security mode activation command to the first user equipment, so that the first user equipment generates, according to security context information, an encryption key and an integrity protection key for data transmission on a control plane and/or an encryption key for data transmission on a user plane; and sending, by the network device, a key update message to second user equipment by using a dedicated message when the network device determines that a key between the network device and the first user equipment needs to be updated, so that the second user equipment sends the key update message to the first user equipment, where the key update message is sent by the network device to the second user equipment after the network device performs encryption and integrity protection on the key update message by using the encryption key and the integrity protection key. By using this embodiment of the present disclosure, a security key between the first user equipment and the network device and a security key between the second user equipment and the network device may be independent of each other and invisible to each other, so as to ensure privacy of direct data transmission between the first user equipment and the network device. In addition, a key update process may be updated by using the second user equipment, so that energy consumption of the first user equipment is reduced, and a standby time is prolonged.

In a possible design, the method further includes: sending, by the network device to the second user equipment, indication information that instructs the second user equipment to forward the key update message to the first user equipment.

According to yet another aspect, an embodiment of this application provides user equipment, where the user equipment may be first user equipment and includes:

a processor, configured to determine to obtain, by executing a first task by using second user equipment, a first result required for communication with a network device, where the first result includes at least one piece of the following information: paging information, information about a cell to be camped on or a serving cell, a serving cell measurement result, a neighboring cell measurement result, system information or updated system information of a cell to be camped on or a serving cell, information about a cell to be camped on or a serving cell that is obtained after cell selection or cell reselection, uplink transmit power information or uplink transmit power adjustment information used in a serving cell, or uplink timing advance information or uplink advance adjustment information used in a serving cell; and a receiver, configured to receive the first result sent by the second user equipment, where the first result is obtained by the second user equipment by executing the first task, where the processor is further configured to communicate with the network device by using the first result.

In a possible design, the first task includes one or more of the following tasks:

cell search, cell measurement, cell selection, cell reselection, cell system information listening, cell paging message listening, cell paging message reception, determining uplink transmit power information or uplink transmit power adjustment information used in a serving cell, determining uplink timing advance information or uplink advance adjustment information used in a serving cell, determining a tracking area, or determining to update a tracking area.

In a possible design, the processor is further configured to:

execute only a second task, where the second task includes tasks other than the first task in the following tasks:

cell search, cell measurement, cell selection, cell reselection, cell system information change listening, cell system information reception, cell paging message listening, cell paging message reception, determining uplink transmit power information or uplink transmit power adjustment information used in a serving cell, determining uplink timing advance information or uplink advance adjustment information used in a serving cell, determining a tracking area, and determining to update a tracking area.

In a possible design, the receiver is further configured to receive first indication information sent by the second user equipment or the network device, where the first indication information is used to instruct to execute the second task.

In a possible design, the user equipment further includes:

a memory, configured to store the first result, so that the processor is further configured to obtain the stored first result when the first user equipment needs to communicate with the network device.

In a possible design, the user equipment further includes:

a transmitter, configured to send a first request message to the second user equipment, where the first request message is used to request the first result.

In a possible design, the processor is further configured to:

establish a direct connection to the network device by using the first result, to perform communication; or indirectly communicate with the network device by using the first result and the second user equipment.

In a possible design, the receiver is further configured to receive a group establishment acknowledgment message sent by the second user equipment, where the group establishment acknowledgment message is used to indicate that a group is established between the first user equipment and the second user equipment.

In a possible design, the transmitter is further configured to send a second request message to the second user equipment, where the second request message is used to request to establish the group between the first user equipment and the second user equipment.

In a possible design, the receiver is further configured to: receive a paging message sent by the second user equipment, where a paging object of the paging message is the first user equipment; or receive, by the first user equipment, a part or all of content of a paging message sent by the second user equipment, where the paging message is sent by the network device and received by the second user equipment; or receive, by the first user equipment, a service notification message sent by the second user equipment, where the service notification message is determined by the second user equipment according to a received paging message sent by the network device.

In a possible design, the processor is further configured to determine to release the group when a preset condition is met.

In a possible design, that the preset condition is met includes:

quality of a signal or a distance between the first user equipment and the second user equipment reaches a threshold; or the first user equipment receives group release indication information sent by the second user equipment or the network device; or the first user equipment receives group release indication information by using a man-machine interface or from an application layer.

In a possible design, the processor is further configured: after releasing the group, start or restart, by the first user equipment, to execute the first task, or continue, by the first user equipment, to camp on a current serving cell.

In a possible design, the transmitter is further configured to send a third request message to the second user equipment, where the third request message is used to instruct to release the group between the first user equipment and the second user equipment.

In a possible design, the transmitter is further configured to: notify, by the first user equipment, the second user equipment whether the first user equipment continues, after the group is released, to be in a same cell or a same tracking area as the second user equipment.

According to yet another aspect, an embodiment of this application provides user equipment, where the user equipment may be second user equipment, and includes:

a processor, configured to execute a first task to obtain a first result required for communication with a network device, where the first result includes at least one piece of the following information: paging information, information about a cell to be camped on or a serving cell, a serving cell measurement result, a neighboring cell measurement result, system information or updated system information of a cell to be camped on or a serving cell, information about a cell to be camped on or a serving cell that is obtained after cell selection or cell reselection, uplink transmit power information or uplink transmit power adjustment information of a serving cell, or uplink timing advance information or uplink advance adjustment information of a serving cell; and a transmitter, configured to send the first result to first user equipment, so that the first user equipment communicates with the network device by using the first result.

In a possible design, the processor is further configured to perform at least one of the following:

performing cell measurement, and obtaining a serving cell measurement result and/or a neighboring cell measurement result;

performing cell selection or cell reselection, and determining information about a selected or reselected cell;

listening to system information of a cell to be camped on or a serving cell, and determining changed system information of the cell to be camped on or the serving cell when the system information of the cell to be camped on or the serving cell changes; or listening to a paging message, and determining that a paging message whose paging object is the first user equipment is obtained by means of listening; and the transmitter is further configured to send a fourth request message to the network device, where the fourth request message is used to obtain parameter information required for a service provided by the network device; and the user equipment further includes a receiver, configured to receive a first response message sent by the network device, where the first response message includes the parameter information, the parameter information includes at least one of uplink transmit power information or uplink transmit power adjustment information, uplink timing advance information or uplink advance adjustment information, or a configuration parameter, and the configuration parameter includes at least one of the following parameters: a physical layer configuration parameter, a media access control MAC layer configuration parameter, a radio link control RLC layer configuration parameter, a Packet Data Convergence Protocol PDCP layer configuration parameter, or a radio resource control RRC configuration parameter.

In a possible design, the user equipment further includes:

a receiver, configured to receive a first request message sent by the first user equipment, where the first request message is used to request the first result.

In a possible design, the processor is further configured to determine to establish a group between the first user equipment and the second user equipment, where the group indicates that the first user equipment and the second user equipment share at least one piece of information used for communication with the network device; and the transmitter is further configured to send a group establishment acknowledgment message to the first user equipment, to indicate that the group is established between the first user equipment and the second user equipment.

In a possible design, the transmitter is further configured to send a group establishment request message to the network device, where the group establishment request message includes information about the group, so that the network device establishes the group according to the group establishment request message; and the receiver is further configured to receive a group establishment acknowledgment message sent by the network device.

In a possible design, the group indicates that the first user equipment and the second user equipment share at least one piece of the following information: information about a cell to be camped on or a serving cell, a serving cell measurement result, a neighboring cell measurement result, system information or updated system information of a cell to be camped on or a serving cell, information about a cell to be camped on or a serving cell that is obtained after cell selection or cell reselection, uplink transmit power information or uplink transmit power adjustment information used in a serving cell, or uplink timing advance information or uplink advance adjustment information used in a serving cell.

In a possible design, the transmitter is further configured to send the information about the group to the network device, to notify the network device that the first user equipment and the second user equipment are in one group.

In a possible design, the receiver is further configured to receive a group establishment request message sent by the first user equipment; or the processor is further configured to determine that a group needs to be established between the first user equipment and the second user equipment.

In a possible design, the information about the group includes any one or more of a group-specific identifier, an identifier of the first user equipment, or an identifier of the second user equipment.

In a possible design, the receiver is further configured to: receive a paging message sent by the network device, where the paging message includes the group information of the group, or the paging message includes the identifier of the first user equipment, or the paging message includes the identifier of the first user equipment and an indication indicating whether to perform a group operation, or the paging message includes the identifier of the first user equipment and an indication indicating whether to forward the paging message to the first user equipment, or the paging message includes the identifier of the first user equipment and the identifier of the second user equipment.

In a possible design, the transmitter is further configured to: forward the paging message to the first user equipment, or send a part or all of content of the paging message to the first user equipment, or send a service notification message to the first user equipment, where the service notification message is determined by the second user equipment according to the received paging message sent by the network device.

In a possible design, the processor is further configured to release, by the second user equipment, the group when a preset condition is met.

In a possible design, that the preset condition is met includes:

quality of a signal or a distance between the first user equipment and the second user equipment reaches a threshold; or the second user equipment receives group release indication information sent by the first user equipment or the network device; or the second user equipment receives group release indication information by using a man-machine interface or from an application layer.

In a possible design, the transmitter is further configured to send group release indication information to the network device, where the group release indication information is used to instruct to release the group between the first user equipment and the second user equipment.

In a possible design, the processor is further configured to perform a process of randomly accessing the network device or a location update process; and the transmitter is further configured to send the group release indication information to the network device in the random access process or the location update process.

In a possible design, the group release indication information sent by the second user equipment to the network device includes:

indication information indicating whether the first user equipment and the second user equipment continue to be in a same cell and/or a same tracking area.

In a possible design, the receiver is further configured to receive group release indication information sent by the first user equipment, where the group release indication information includes indication information indicating whether the first user equipment and the second user equipment continue to be in a same cell and/or a same tracking area.

According to yet another aspect, an embodiment of this application provides an access network device, including:

a receiver, configured to receive indication information that is of a correspondence between first user equipment and second user equipment and that is sent by the second user equipment, where the correspondence means that the first user equipment obtains, by executing a first task by using the second user equipment, a first result required for communication with a network device, and the first result includes at least one piece of the following information: paging information, information about a cell to be camped on or a serving cell, a serving cell measurement result, a neighboring cell measurement result, system information or updated system information of a cell to be camped on or a serving cell, information about a cell to be camped on or a serving cell that is obtained after cell selection or cell reselection, uplink transmit power information or uplink transmit power adjustment information used in a serving cell, or uplink timing advance information or uplink advance adjustment information used in a serving cell; and a processor, configured to determine, based on the correspondence, that the second user equipment executes the first task.

In a possible design, the indication information of the correspondence includes information about a group, where the information about the group is used to indicate that a group is established between the first user equipment and the second user equipment, and the group indicates that the first user equipment obtains, by executing the first task by using the second user equipment, the first result required for communication with the network device.

In a possible design, the receiver is further configured to receive a group establishment request message sent by the second user equipment, where the group establishment request message carries information about a group, the information about the group includes an identifier of the first user equipment and an identifier of the second user equipment, and the group establishment request message is used to instruct to establish the group between the first user equipment and the second user equipment.

In a possible design, the processor is further configured to: establish the group between the first user equipment and the second user equipment according to the group establishment request message, and generate an identifier of the group.

In a possible design, the access network device further includes:

a transmitter, configured to send a group establishment acknowledgment message to the second user equipment, where the group establishment acknowledgment message is used to indicate that the access network device agrees to establish the group.

In a possible design, the processor is further configured to: when the processor needs to send a paging message whose paging object is the first user equipment, send the paging message to the second user equipment according to the correspondence information.

In a possible design, the paging message sent to the second user equipment includes the information about the group, or the paging message includes the identifier of the first user equipment, or the paging message sent to the second user equipment includes the identifier of the first user equipment and an indication indicating whether to perform a group operation, or the paging message includes the identifier of the first user equipment and an indication indicating whether to forward the paging message to the first user equipment, or the paging message includes the identifier of the first user equipment and the identifier of the second user equipment.

In a possible design, the transmitter is further configured to send the information about the group to a core network device.

According to yet another aspect, an embodiment of this application provides a core network device, including:

a receiver, configured to receive indication information that is of a correspondence between first user equipment and second user equipment and that is sent by an access network device, where the correspondence means that the first user equipment obtains, by executing a first task by using the second user equipment, a first result required for communication with a network device, and the network device includes the core network device and the access network device; and a processor, configured to communicate with the first user equipment based on the correspondence.

In a possible design, the receiver is further configured to receive a group establishment request message sent by the access network device, where the group establishment request message carries information about a group, and the information about the group includes an identifier of the first user equipment and an identifier of the second user equipment; and the processor is further configured to: establish the group between the first user equipment and the second user equipment according to the group establishment request message, and generate an identifier of the group.

In a possible design, the core network device further includes:

a transmitter, configured to send a group establishment acknowledgment message to the access network device, where the group establishment acknowledgment message includes the identifier of the group.

In a possible design, the transmitter is further configured to: when the transmitter needs to send a paging message whose paging object is the first user equipment, send the paging message to the access network device according to the correspondence, and instruct the access network device to send the paging message to the second user equipment.

According to yet another aspect, an embodiment of this application provides user equipment, where the user equipment is first user equipment and includes:

a processor, configured to: establish a connection to a network device; and execute, by the first user equipment, a third task by using or with the assistance of second user equipment, where the third task is a task required for communication between the first user equipment and the network device, and the third task includes at least one of the following: performing measurement according to measurement configuration information, sending a measurement result to the network device, or being handed over to a target cell or a target base station in a random access manner.

In a possible design, the measurement configuration information includes radio resource management RRM measurement configuration information and/or channel state indication information CSI measurement configuration information.

In a possible design, the measurement configuration information includes first measurement configuration information and/or second measurement configuration information, the first measurement configuration information is configured by the network device for the first user equipment, and the second measurement configuration information is configured by the network device for the second user.

In a possible design, the user equipment further includes:

a receiver, configured to receive the first measurement configuration information and/or the second measurement configuration information sent by the second user equipment.

In a possible design, the receiver is further configured to receive a first measurement result sent by the second user equipment, where the first measurement result is obtained by the second user equipment by performing measurement according to the first measurement configuration information and/or the second measurement configuration information.

In a possible design, the processor is further configured to perform measurement according to the first measurement configuration information and/or the second measurement configuration information, to obtain a second measurement result; and the user equipment further includes: a transmitter, configured to: when a difference between the first measurement result and the second measurement result exceeds a preset threshold, notify the second user equipment that the difference between the first measurement result and the second measurement result exceeds the preset threshold; or instruct the second user equipment to cancel measurement performed according to the measurement configuration information; or notify the second user equipment that the first user equipment starts to autonomously perform measurement; or send the second measurement result to the second user equipment periodically or in an event triggering manner, so that the second user equipment performs verification according to the second measurement result.

In a possible design, the receiver is further configured to receive handover information sent by the second user equipment, where the handover information includes information about the target cell, uplink timing advance information or uplink advance adjustment information used in the target cell, and/or uplink transmit power information or uplink transmit power adjustment information used in the target cell; and the processor is further configured to communicate with the network device by using the handover information.

In a possible design, the receiver is further configured to receive handover indication signaling sent by the network device or the second user equipment, where the handover indication signaling may be physical layer control signaling, MAC signaling, or RRC signaling; and the processor is further configured to directly access the target cell or the target base station according to the handover indication signaling by using the handover information.

In a possible design, the processor is further configured to execute a fourth task, where the fourth task includes at least one of the following: receiving downlink data directly sent by the network device, receiving downlink control signaling directly sent by the network device, directly sending scheduling request signaling to the network device, directly receiving secure activation-related signaling from a network side device, directly sending secure activation-related signaling to the network device, or directly feeding back CSI measurement result information to the network device.

In a possible design, the processor is further configured to execute the fourth task to obtain a second result, where the second result includes HARQ information obtained by the first user equipment by decoding the downlink data or the downlink control signaling, and the HARQ information is information indicating whether the downlink data is correctly decoded; and the transmitter is further configured to directly feed back the HARQ information to the network device; or the processor is further configured to execute the fourth task to obtain a second result, where the second result includes that the first user equipment determines that processing of the downlink control signaling or processing of the secure activation-related signaling is correctly completed; and the transmitter is further configured to directly feed back, to the network device, feedback information indicating whether processing of the downlink control signaling is completed.

According to yet another aspect, an embodiment of this application provides user equipment, where the user equipment may be second user equipment, and includes:

a receiver, configured to receive measurement configuration information sent by a network device, where the measurement configuration information is used to execute a third task, and the third task is a task that is executed by the second user equipment in place of first user equipment and that is required for communication with the network device; and a processor, configured to execute the third task, where the third task includes at least one of the following: performing measurement according to the measurement configuration information, sending a measurement result to the network device, or performing a process of being handed over to a target base station in a random access manner.

In a possible design, the processor is further configured to determine that the first user equipment establishes a connection to the network device; or the receiver is further configured to receive first indication information sent by the first user equipment or the network device, where the first indication information is used to request or instruct the second user equipment to execute the third task.

In a possible design, the user equipment further includes: a transmitter, configured to send a measurement configuration information obtaining request to the network device; and the receiver is further configured to receive the measurement configuration information sent by the network device.

In a possible design, the measurement configuration information includes radio resource management RRM measurement configuration information and/or channel state indication information CSI measurement configuration information.

In a possible design, the measurement configuration information includes first measurement configuration information and/or second measurement configuration information, the first measurement configuration information is configured by the network device for the first user equipment, and the second measurement configuration information is configured by the network device for the second user.

In a possible design, the measurement configuration information further includes second indication information, where the second indication information is used to indicate whether the first measurement configuration information can be used for the second user equipment, or indicate that the measurement configuration information includes the second measurement configuration information and indicate whether the second measurement configuration information can be used for the first user equipment.

In a possible design, the processor is further configured to perform measurement according to the first measurement configuration information and/or the second measurement configuration information, to obtain a first measurement result; and the transmitter is further configured to send the first measurement result to the network device.

In a possible design, the processor is further configured to: perform comprehensive measurement according to the first measurement configuration information and the second measurement configuration information, to obtain the first measurement result; or perform measurement according to the first measurement configuration information, to obtain the first measurement result.

In a possible design, the transmitter is further configured to send the measurement configuration information to the first user equipment.

In a possible design, the transmitter is further configured to: when the first measurement result meets a specific threshold, send the first measurement result to the first user equipment, or send the first measurement result to the first user equipment periodically or in an event triggering manner.

In a possible design, the receiver is further configured to receive a second measurement result sent by the first user equipment, where the second measurement result is obtained by the first user equipment by performing measurement according to the first measurement configuration information and/or the second measurement configuration information; and the processor is further configured to: when a difference between the first measurement result and the second measurement result exceeds a preset threshold, cancel measurement performed according to the measurement configuration information in place of the first user equipment; or the transmitter is further configured to: when a difference between the first measurement result and the second measurement result exceeds a preset threshold, notify the first user equipment that the difference between the first measurement result and the second measurement result exceeds the preset threshold, or instruct the first user equipment to autonomously perform measurement.

In a possible design, that the difference between the first measurement result and the second measurement result exceeds the preset threshold includes:

the difference between the first measurement result and the second measurement result exceeds the preset threshold within a preset time period.

In a possible design, the receiver is further configured to receive a handover command sent by the network device, where the handover command includes information about a target cell; and the processor is further configured to be handed over to the target cell according to the information about the target cell.

In a possible design, the network device includes a target access network device, the handover command further includes information about the target access network device, and the processor is further configured to be handed over to the target access network device according to the information about the target access network device and the information about the target cell.

In a possible design, the transmitter is further configured to send, to the target access network device, information about a group between the first user equipment and the second user equipment or information about a correspondence between the first user equipment and the second user equipment, where the correspondence means that the first user equipment executes at least one of the following tasks by using the second user equipment: cell search, cell measurement, cell selection, cell reselection, cell system information change listening, cell system information reception, cell paging message listening, cell paging message reception, determining uplink transmit power information or uplink transmit power adjustment information used in a serving cell, determining uplink timing advance information or uplink advance adjustment information used in a serving cell, determining a tracking area, or determining to update a tracking area.

In a possible design, the processor is further configured to obtain the information about the target cell and/or information about the target base station, uplink timing advance information or uplink advance adjustment information used in the target cell, and/or uplink transmit power information or uplink transmit power adjustment information used in the target cell; and the transmitter is further configured to send handover information to the first user equipment, where the handover information includes the information about the target cell and/or the information about the target base station, the uplink timing advance information or the uplink advance adjustment information used in the target cell, and/or the uplink transmit power information or the uplink transmit power adjustment information used in the target cell.

In a possible design, the transmitter is further configured to send handover indication signaling to the first user equipment, where the handover indication signaling carries the handover information, to instruct the first user equipment to directly access the target cell or the target base station by using the handover information.

According to yet another aspect, an embodiment of this application provides an access network device, including:

a processor, configured to: after a access network device establishes a connection to first user equipment, configure measurement configuration information required by second user equipment to execute a third task, where the third task is a task that is executed by the second user equipment in place of the first user equipment and that is required by the first user equipment to communicate with the network device; and a transmitter, configured to send the measurement configuration information to the second user equipment, so that the second user equipment executes the third task according to the measurement configuration information, where the third task includes at least one of the following: performing measurement according to the measurement configuration information, sending a measurement result to the network device, or performing a process of being handed over to a target access network device in a random access manner.

In a possible design, the transmitter is configured to send indication information to the second user equipment, where the indication information is used to instruct the second user equipment to execute the third task, and the indication information carries the measurement configuration information.

In a possible design, the transmitter is configured to send indication information to the second user equipment, where indication information is used to instruct the second user equipment to execute the third task according to the measurement configuration information.

In a possible design, the configuration information includes RRM measurement configuration information and/or CSI measurement configuration information.

In a possible design, the processor is further configured to send a first handover command to the second user equipment when determining that the first user equipment needs to be handed over to a target access network device or a target cell, where the first handover command includes information about the target access network device or the target cell.

In a possible design, the transmitter is further configured to send handover indication signaling to the first user equipment after determining that the second user equipment is handed over to the target access network device or the target cell, where the handover indication signaling is physical layer information, MAC signaling, or RRC signaling.

In a possible design, the handover indication signaling further includes any one or more of uplink timing advance information or uplink advance adjustment information that needs to be used by the first user equipment on the target access network device or in the target cell, or uplink transmit power information or uplink transmit power adjustment information that needs to be used by the first user equipment on the target access network device or in the target cell.

In a possible design, the transmitter is further configured to send, to the target access network device, information about a group between the first user equipment and the second user equipment or information about a correspondence between the first user equipment and the second user equipment, where the correspondence means that the first user equipment executes at least one of the following tasks by using the second user equipment: cell search, cell measurement, cell selection, cell reselection, cell system information change listening, cell system information reception, cell paging message listening, cell paging message reception, determining uplink transmit power information or uplink transmit power adjustment information used in a serving cell, determining uplink timing advance information or uplink advance adjustment information used in a serving cell, determining a tracking area, or determining to update a tracking area.

According to yet another aspect, an embodiment of this application provides user equipment, including:

a processor, configured to establish a connection to a network device; and a receiver, configured to directly receive a security mode activation command sent by the network device, where the processor is further configured to: generate, according to security context information, an encryption key and an integrity protection key for data transmission on a control plane and/or an encryption key for data transmission on a user plane, and when the first user equipment performs data transmission with the network device, use the generated encryption key and integrity protection key for data transmission on the control plane and/or the generated encryption key for data transmission on the user plane;

the receiver is configured to receive a key update message sent by second user equipment, where the key update message is sent by the network device to the second user equipment after the network device performs encryption and integrity protection on the key update message by using the encryption key and the integrity protection key; and the processor is further configured to update, according to the key update message, any one or more of the encryption key and the integrity protection key for data transmission on the control plane or the encryption key for data transmission on the user plane.

In a possible design, the processor is further configured to generate a first key according to the security context information;

the processor is further configured to generate a second key according to one or more of the first key, NAS COUNT information, an identifier of the network device, or an identifier of the second user equipment; and the processor is further configured to: calculate, from the second key according to a security algorithm for the network device, the encryption key and the integrity protection key for data transmission on the control plane and/or the encryption key for data transmission on the user plane; and when the first user equipment performs data transmission with the network device, encrypt or decrypt data on the control plane by using the encryption key, perform integrity protection on the data on the control plane by using the integrity protection key or verify integrity of the data on the control plane by using the integrity protection key, and/or decrypt or encrypt data on the user plane by using the encryption key.

According to yet another aspect, an embodiment of this application provides a network device, including:

a processor, configured to establish a connection to first user equipment; and a transmitter, configured to send a security mode activation command to the first user equipment, so that the first user equipment generates, according to security context information, an encryption key and an integrity protection key for data transmission on a control plane and/or an encryption key for data transmission on a user plane, where the transmitter is further configured to: send a key update message to second user equipment by using a dedicated message when the network device determines that a key between the network device and the first user equipment needs to be updated, so that the second user equipment sends the key update message to the first user equipment, where the key update message is sent by the network device to the second user equipment after the network device performs encryption and integrity protection on the key update message by using the encryption key and the integrity protection key.

In a possible design, the transmitter is further configured to send, to the second user equipment, indication information that instructs the second user equipment to forward the key update message to the first user equipment.

According to yet another aspect, an embodiment of the present disclosure provides a communications system, where the system includes the access network device, the first user equipment, and the second user equipment according to the foregoing aspects, or the system includes the access network device, the core network device, the first user equipment, and the second user equipment.

According to yet another aspect, an embodiment of the present disclosure provides a computer storage medium, configured to store a computer software instruction used by the network device, and the computer storage medium includes a program designed to execute the foregoing aspects.

According to yet another aspect, an embodiment of the present disclosure provides a computer storage medium, configured to store a computer software instruction used by the first user equipment or the second user equipment, and the computer storage medium includes a program designed to execute the foregoing aspects.

In the embodiments of the present disclosure, the second user equipment executes some tasks required for communication between the first user equipment and the network device, and the first user equipment properly communicates with the second user equipment. In this way, energy consumption of the first user equipment may be reduced, thereby prolonging a standby time and improving user experience.

DESCRIPTION OF EMBODIMENTS

The technical solutions of the present disclosure are further described in detail with reference to accompanying drawings and embodiments as follows:

For better understanding of the embodiments of the present disclosure, the following uses specific embodiments to provide further explanations with reference to the accompanying drawings, and the embodiments constitute no limitation to the embodiments of the present disclosure.

Figure 1:
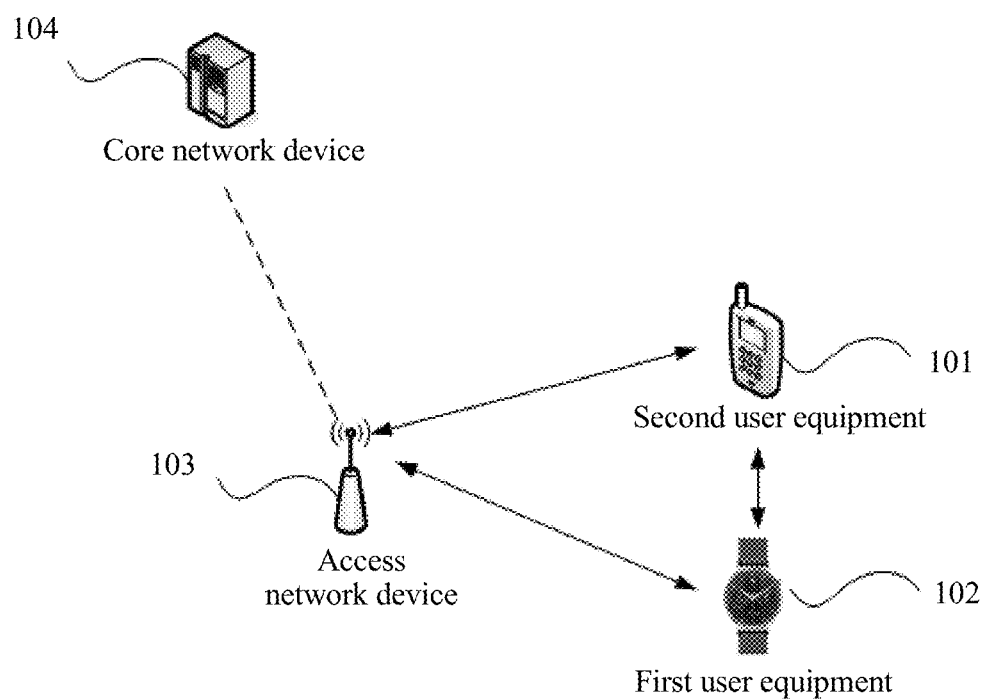
FIG. 1 is a schematic diagram of a communications system according to an embodiment of the present disclosure.

FIG. 1 is a schematic diagram of a communications system according to an embodiment of the present disclosure. FIG. 1 is a schematic diagram of a partial structure of a system architecture related to this embodiment of the present disclosure. As shown in FIG. 1, the system architecture may specifically include a first user equipment 101, a second user equipment 102, and an access network device 103, and may further include a core network device 104. Short-range communication can be performed between the first user equipment 101 and the second user equipment 102, for example, communication performed by using Bluetooth, WiFi, or the like. The first user equipment 101 and the second user equipment 102 may access the core network device 104 by using the access network device 103, to perform communication, and may further access the Internet by using a core network, to perform Internet communication.

The technology described in the present disclosure may be applied to a Long Term Evolution (LTE) system or other wireless communications systems that use various radio access technologies, for example, systems that use access technologies such as Code Division Multiple Access, Frequency Division Multiple Access, Time Division Multiple Access, orthogonal frequency division multiple access, and single carrier frequency division multiple access. In addition, the technology may also be applied to a subsequent evolved system such as a 5th generation 5G system of the LTE system. For clarity, the LTE system is used only as an example herein for description. In the LTE system, an evolved UMTS terrestrial radio access network (E-UTRAN) serves as a radio access network, and an evolved packet core (EPC) serves as a core network. A UE accesses an IMS network by using the E-UTRAN and the EPC.

The first user equipment 101 may include various handheld devices, in-vehicle devices, wearable devices, or computing devices that have a wireless communication function, or another processing device connected to a wireless modem, and a user equipment (UE), a mobile station (MS), a terminal, and a terminal device that are in various forms. For ease of description, in this application, all the devices mentioned above are collectively referred to as first user equipment or UE.

The second user equipment 102 may include various wearable devices (WD) that have a wireless communication function, for example, products such as a watch and a wrist strap supported by a wrist, shoes and socks supported by feet or another product worn on a leg, glasses, a helmet, a headband, and the like supported by a head, and products in various forms such as smart clothes, a smart school bag, smart canes, and a smart accessory. The second user equipment 102 may be further a user equipment that needs to save energy, for example, a handheld device, an in-vehicle device, a wearable device, a computing device, or another processing device connected to a wireless modem, and a user equipment (UE), a mobile station (MS), a terminal, and a terminal device that are in various forms. For ease of description and for distinguishing from the first user equipment, in this application, all the devices mentioned above are collectively referred to as a second user equipment or a WD.

The access network device 103 may be an apparatus that is deployed in a radio access network and that is used to provide a wireless communication function for the UE or a WD. The apparatus may include a macro base station, a micro base station, a relay node, an access point, and the like that are in various forms. In systems that use different radio access technologies, names of a device that has a base station function may be different. For example, in an LTE network, the device is referred to as an evolved NodeB (eNB or eNodeB), and in a $3^{rd}$ generation 3G network, the device is referred to as a NodeB. For ease of description, in this application, all the apparatuses that provide a wireless communication function for the UE are collectively referred to as a base station or an eNB.

The core network device 104 may be a device that provides a user connection, manages a user, and completes service carrying and that is used as a bearer network to provide an interface to an external network. Establishment of a user connection includes functions such as mobility management (MM), call management (CM), exchanging/routing, and recording notification (completing a connection to a peripheral device of an intelligent network with reference to an intelligent network service). User management includes user description, QoS (quality of service), user communication recording (Accounting), providing a virtual home environment by a dialog with an intelligent network platform, and security (a corresponding security measure provided by an authentication center includes security management for a mobile service and security processing for external network access). Bearer connection (Access to)

includes connecting to an external PSTN, an external circuit data network, a packet data network, the Internet and intranets, an SMS server of a mobile operator, and the like. Basic services that may be provided by a core network include mobile office, e-commerce, communication, an entertainment service, a travel service, a location-based service, a telemetry service, a simple message transfer service (listening control), and the like. For example, the core network device 104 is an MME (Mobility Management Entity, mobility management entity) and an SGW (serving gateway) in the LTE network. For ease of description, in this application, the devices mentioned above that provide a user connection, manage a user, and complete service carrying, and that are used as bearer networks to provide interfaces to an external network are collectively referred to as a core network device MME or SGW.

Short-range communication may be performed between the first user equipment 101 and the second user equipment 102. For example, both the first user equipment and the second user equipment support a Bluetooth function, and a Bluetooth connection may be established between the first user equipment and the second user equipment in advance. For another example, both the first user equipment and the second user equipment support a WiFi (Wireless Fidelity) function, and the first user equipment and the second user equipment may access a same wireless router in advance, or one of the first user equipment and the second user equipment serves as a WiFi hotspot to establish a connection between the two user equipments. Short-range communication may be alternatively performed between the first user equipment 101 and the second user equipment 102 in a connectionless manner. For example, user equipment with Bluetooth of a version later than 4.0 may transmit data without a connection. It should be noted that, herein a specific implementation of short-range communication performed by using Bluetooth or WiFi is merely an example, and another implementation that can implement short-range communication between two user equipments should also be included. Details are not described herein.

In addition, a network device in this application may include the access network device 103 and the core network device 104.

A system such as Long Term Evolution (LTE) or a UMTS (Universal Mobile Telecommunications System) is particularly applicable to an EPS (evolved packet system) in LTE. The EPS is a concept proposed by a 3GPP (3rd Generation Partnership Project) standards committee in the 4th generation mobile communications.

Figure 2:
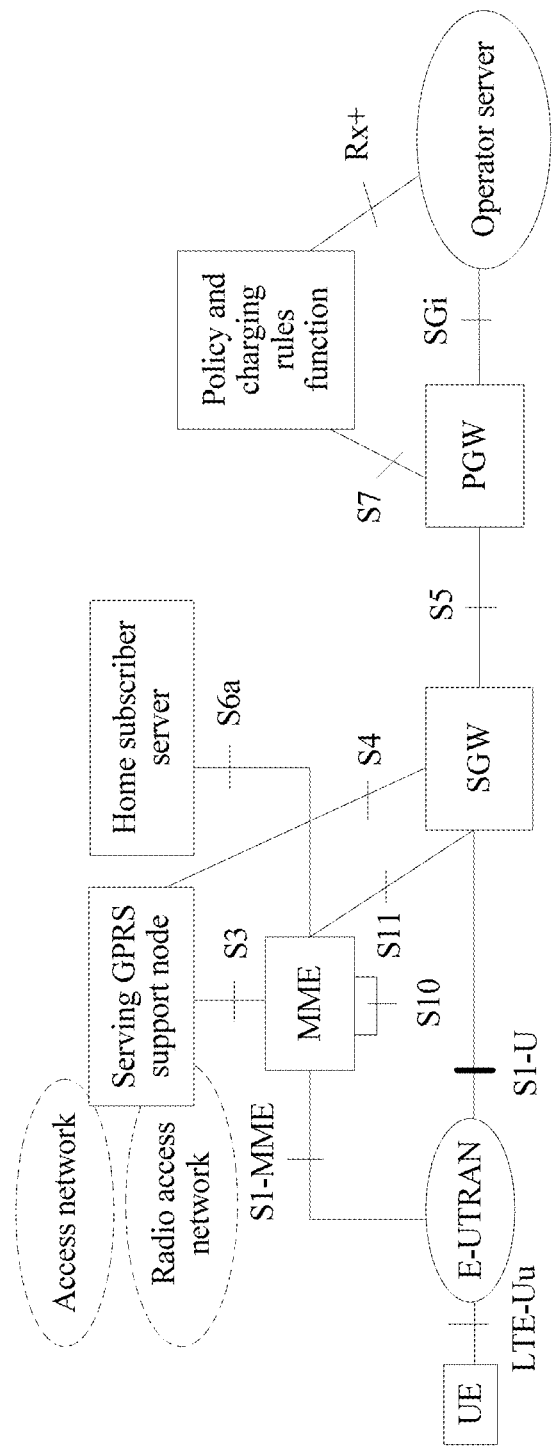
FIG. 2 is a schematic diagram of an architecture of an LTE network.

FIG. 2 is a schematic diagram of an architecture of an LTE network. The LTE network mainly includes a UE (user equipment), an E-UTRAN (evolved universal terrestrial radio access network), an EPC (evolved packet core), and the like. The UE may include a first user equipment and a second user equipment. The EPC mainly includes an MME, a P-GW (packet data network gateway), and an SGW, can implement conventional capabilities of a mobile network such as subscription data storage for a user, mobility management, and data exchange, and can provide super-speed Internet experience for a user. In addition, the E-UTRAN may be a network that includes a plurality of eNBs (evolved NodeB), and implements functions such as a radio physical layer function, resource scheduling and radio resource management, radio access control, and mobility management.

A UMTS system mainly includes a UTRAN (universal terrestrial radio access network) and a CN (core network). The UTRAN is a network that mainly includes a plurality of base stations and base station controllers or RNCs (radio network controller). The core network CN includes an SGSN (serving GPRS support node), and the SGSN communicates with a base station by using a base station controller.

It may be found in this application by means of analysis that power consumption for communication between the first user equipment and the second user equipment is less than power consumption for communication between a network device and the first user equipment, and more energy can be saved because communication between the first user equipment and the second user equipment does not need to be measured frequently. In this embodiment of the present disclosure, the second user equipment executes some tasks required for communication between the first user equipment and the network device, and the first user equipment properly communicates with the second user equipment. In this way, energy consumption of the first user equipment may be reduced, thereby prolonging a standby time and improving user experience.

With reference to different tasks and scenarios, the present disclosure is described below in detail.

In a process of communicating with a network device by a first user equipment, the first user equipment usually needs to obtain information such as information about a cell to be camped on or a serving cell, a serving cell measurement result, a neighboring cell measurement result, system information or updated system information of a cell to be camped on or a serving cell, information about a cell to be camped on or a serving cell that is obtained after cell selection or cell reselection, uplink transmit power information or uplink transmit power adjustment information of a serving cell, and uplink timing advance information or uplink advance adjustment information of a serving cell. Only when the information is obtained, it can be ensured that the first user equipment normally communicates with the network device. In an embodiment of the present disclosure, the information may be obtained by using the second user equipment, and then the first user equipment obtains the data from the second user equipment.

Figure 3:
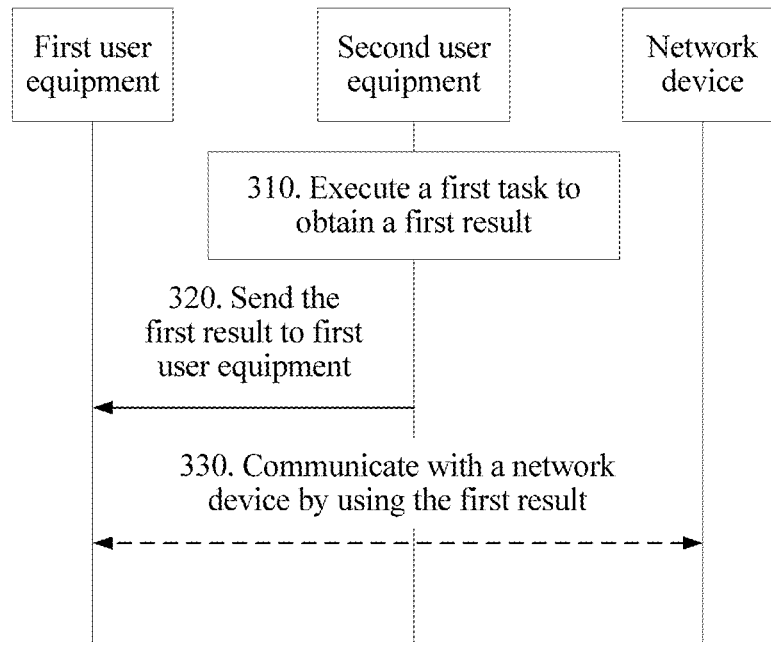
FIG. 3 is a schematic communication diagram according to a method embodiment of the present disclosure.

FIG. 3 is a schematic communication diagram according to a method embodiment of the present disclosure. The method may be applied to the communications system shown in FIG. 1. As shown in FIG. 3, the method may include the following steps.

310. The second user equipment executes a first task to obtain a first result, where the first task may include one or more of the following tasks: cell search, cell measurement, cell selection, cell reselection, cell system information change listening, cell system information reception, cell paging message listening, cell paging message reception, determining uplink transmit power information or uplink transmit power adjustment information used in a serving cell, determining uplink timing advance information or uplink advance adjustment information used in a serving cell, determining a tracking area, determining to update a tracking area, or the like; and the first result may include one or more of the following results: paging information, information about a cell to be camped on or a serving cell, a serving cell measurement result, a neighboring cell measurement result, system information or updated system information of a cell to be camped on or a serving cell, information about a cell to be camped on or a serving cell that is obtained after cell selection or cell reselection, uplink transmit power information or uplink transmit power adjustment information used in a serving cell, uplink timing advance information or uplink advance adjustment information used in a serving cell, or the like.

The first user equipment may execute a second task. The second task may include tasks other than the first task in the following tasks: cell search, cell measurement, cell selection, cell reselection, cell system information change listening, cell system information reception, cell paging message listening, cell paging message reception, determining uplink transmit power information or uplink transmit power adjustment information used in a serving cell, determining uplink timing advance information or uplink advance adjustment information used in a serving cell, determining a tracking area, and determining to update a tracking area. In other words, a set of the first task and the second task may be included in all tasks required for communication between a user equipment and a network device. In this embodiment of the present disclosure, in a communication process of the first user equipment, the first user equipment independently executes some tasks, and gives other tasks to the second user equipment (a proxy device) for execution, so as to save energy, and prolong a standby time.

The second user equipment may specifically determine to start to execute the first task in the following manners.

Manner 1: The second user equipment may actively request to execute the first task, and notify the first user equipment. For example, a user usually may have both a UE and a WD. In this case, the user may trigger, at a UE end, a request for executing the first task, the UE notifies the WD after receiving the request, and the WD stops or skips executing the first task after receiving the notification. In this way, the WD can save partial power required for executing the first task.

Manner 2: The second user equipment may execute the first task after receiving a request message sent by the first user equipment. For example, a WD sends a request message to the UE after determining that the WD needs to save power or after receiving a request triggered by a user, to request the UE to execute the first task in place of the WD.

Manner 3: The second user equipment may receive a request message or indication information sent by a network device. For example, when the network device determines that a WD needs to save power, or when the network device receives a request message sent by a UE or a WD, the network device determines the UE that is in an area the same as the WD, and sends a request message or execution information to the UE, to request or instruct the UE to execute the first task; or if the UE to execute the first task is specified in a request message sent by a UE or a WD, the network device directly sends a request message or execution information to the specified UE.

In addition, the first task may be a task that needs to be executed for communication between the first user equipment and the network device. In this case, the first result is also obtained for the first user equipment. The first task may be a task executed for normal communication between the second user equipment and the network device. In this case, the obtained first result may be used by the first user equipment, and may also be used for normal communication between the second user equipment and the network device. In other words, the first result may be obtained by the second user equipment specially for the first user equipment, or may be obtained by the second user equipment during normal communication of the second user equipment but may be provided for the first user equipment for use.

The network device determines a correspondence between the first user equipment and the second user equipment. The correspondence means that the first user equipment obtains, by executing the first task by using the second user equipment, the first result required for communication with the network device. The network device may cooperate with the second user equipment according to the correspondence between the first user equipment and the second user equipment, to execute the first task. In other words, when executing the first task, the second user equipment may need cooperation of the network device, and the network device knows that the second user equipment executes the task for the first user equipment. Specifically, when executing the first task, the second user equipment may send data or information to the network device, to indicate that the second user equipment needs cooperation of the network device. When returning data or an instruction, the network device indicates that the network device knows that the first user equipment executes the first task by using the second user equipment.

It should be noted that short-range communication can be performed between the first user equipment and the second user equipment. In other words, for example, the first user equipment and the second user equipment are in a same tracking area.

320. The second user equipment sends the first result to first user equipment.

The first result may be sent in the following manners:

Manner 1: The first user equipment may send a request message for the first result to the second user equipment. The second user equipment may send the obtained first result to the first user equipment after receiving the request message, or may perform step 310 after receiving the request message, and then send the obtained first result to the first user equipment.

Manner 2: The second user equipment may send a changed first result to the first user equipment when finding that the first result changes.

Actual tasks are described below, so as to more intuitively understand the first task and the first result.

1. The second user equipment may perform cell measurement, obtain a serving cell measurement result and/or a neighboring cell measurement result, and then send the measurement result to the first user equipment.

2. The second user equipment may perform cell selection or cell reselection when necessary, determine information about a selected or reselected cell, and send the information about the selected or reselected cell to the first user equipment.

3. The second user equipment listens to system information of a cell to be camped on or a serving cell, determines changed system information of the cell to be camped on or the serving cell when the system information of the cell to be camped on or the serving cell changes, and sends the changed system information to the first user equipment.

4. The second user equipment listens to a paging message, and when the second user equipment obtains, by means of listening, a paging message whose paging object is the first user equipment, the second user equipment forwards the paging message to the first user equipment, or the second user equipment sends a part or all of content of the paging message to the first user equipment.

5. The second user equipment sends a request message to the network device, to obtain parameter information required for a service provided by the network device. The request message may be a random access preamble. After receiving the request message, the network device adds corresponding parameter information to a response message, and sends the response message to the second user equipment. The second user equipment receives the response message sent by the network device. The parameter information may include uplink transmit power information or uplink transmit power adjustment information, uplink timing advance information or uplink advance adjustment information, and/or a configuration parameter. The configuration parameter includes at least one of the following parameters: a physical layer configuration parameter, a MAC (media access control) layer configuration parameter, an RLC (radio link control) layer configuration parameter, a PDCP packet data convergence protocol) layer configuration parameter, or a radio resource control RRC configuration parameter. The second user equipment sends the parameter information to the first user equipment.

The second user equipment determines the parameter information currently used for communication between the second user equipment and the network device, and sends the parameter information to the first user equipment.

Specific execution processes of the foregoing tasks are all described in a communications protocol, and for the processes, refer to the communications protocol for understanding. Details are not described herein.

330. After receiving the first result sent by the second user equipment, the first user equipment communicates with a network device by using the first result.

After receiving the first result, the first user equipment may first store the first result, and when there is a need, obtains the stored first result to communicate with the network device. For example, the first user equipment may send a request message to the second user equipment, to request the first result.

The first user equipment may establish a direct connection to the network device by using the first result, to perform communication; or the first user equipment may indirectly communicate with the network device by using the first result and the second user equipment.

Another case is described below.

In a specific implementation process of this embodiment of the present disclosure, a group may be established between first user equipment and second user equipment, and a network device is notified of the group; or a network device establishes a group. In this way, the first user equipment, the second user equipment, and the network device know that the first user equipment executes a first task by using the second user equipment, and some tasks of the first user equipment that have a higher directionality requirement may also be executed by the second user equipment. More detailed descriptions are made below with reference to an accompanying drawing.

Figure 4:
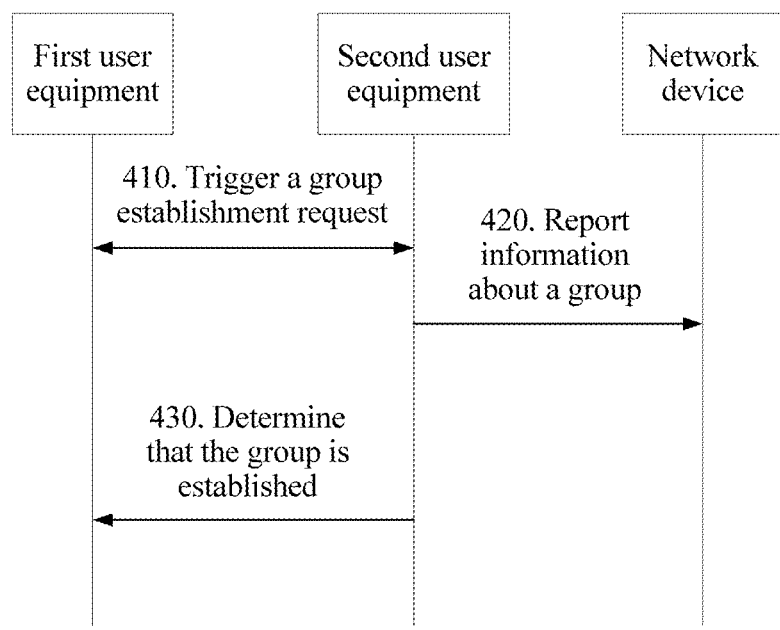
FIG. 4 is another schematic communication diagram according to a method embodiment of the present disclosure.

FIG. 4 is another schematic communication diagram according to a method embodiment of the present disclosure. The method may be applied to the communications system shown in FIG. 1. As shown in FIG. 4, the method may include the following steps.

410. Trigger a group establishment request.

Second user equipment may trigger the group establishment request, or first user equipment may trigger the group establishment request, and the first user equipment sends the group establishment request to the second user equipment.

420. Report information about a group.

After determining that there is a need to establish a group, the second user equipment needs to determine information about the first user equipment and the second user equipment between which a group needs to be established, for example, an identifier of the first user equipment and an identifier of the second user equipment.

The second user equipment may establish a group according to the information about the first user equipment and the second user equipment, for example, may generate a number of the group, and associate the number of the group with each of the identifier of the first user equipment and the identifier of the second user equipment.

Alternatively, the second user equipment may send a group establishment request message to a network device, and the request message carries information about the first user equipment and the second user equipment between which a group needs to be established. After receiving the group establishment request message, the network device establishes a group according to the information carried in the request, and returns a group establishment acknowledgment message to the second user equipment. For example, the network device may establish the group according to the group establishment request message, may generate a number of the group, and associate the number of group with each of the identifier of the first user equipment and the identifier of the second user equipment. Then the network device sends the group establishment acknowledgment message to the second user equipment.

430. Determine that the group is established.

The second user equipment sends a group establishment acknowledgment message to the first user equipment after the second user equipment receives the group establishment acknowledgment message sent by the network device or after the second user equipment establishes the group.

It should be noted that the group is merely intended to clarify that the first user equipment, the second user equipment, and the network device all know that the first user equipment executes, by using the second user equipment, some tasks in a process of communication with the network device, and all other manners that can achieve the objective fall within the scope of the present disclosure.

In addition, the network device may include an access network device and a core network device, and both of the access network device and the core network device can implement functions of the network device.

In a group establishment process, when the core network device needs to establish a group, the access network device needs to send the information about the group to the core network device, the core network device returns a group establishment acknowledgment message after receiving the information about the group, and after receiving the group establishment acknowledgment message, the access network device sends a group establishment acknowledgment message to the second user equipment.

When the group is established by the access network device, the access network device may report the information about the group to the core network device.

After the group between the first user equipment and the second user equipment is successfully established, the network device may consider the first user equipment and the second user equipment as one device. In other words, when the network device has data that needs to be sent to the first user equipment or the second user equipment, the network device may send all the data to the second user equipment. To avoid data disorder, the network device may add an identifier to the data, to indicate, to the second user equipment, a device to which the data belongs. Alternatively, it is specified in a group establishment process that the second user equipment is only responsible for executing a task for the first user equipment. In addition, the network device may also know that some tasks executed by the second user equipment are executed in place of the first user equipment.

After the group is established, some tasks that having relatively explicit directionality may also be executed by using the second user equipment.

For example, when the network device has a paging message for the first user equipment, the network device may send the paging message to the second user equipment based on the information about the group. The paging message may carry indication information, to indicate that a paging object is the group, or that a paging object is not the second user equipment, or that a paging object is the first user equipment. When receiving the paging message sent by the network device, the second user equipment may directly forward the paging message to the first user equipment, or may send content of the paging message to the first user equipment. When sending the content of the paging message to the first user equipment, the second user equipment may filter out content useless for the first user equipment. For example, the paging message carries the identifier of the second user equipment, and the second user equipment may remove the identifier and then send the paging message to the first user equipment. Herein the object may be a service notification message sent to the first user equipment. The service notification message receiving process is similar to a paging message receiving process, and for the service notification message receiving process, refer to the paging message receiving process for understanding.

When the network device includes the access network device and the core network device, if the core network device has data that needs to be sent to the first user equipment, the core network device may directly send the data to the access network device. The access network device sends the data to the second user equipment according to the information about the group. Alternatively, the core network device sends the data to the access network device according to the information about the group, instructs the access network device to send the data to the second user equipment, and indicates that the data is data of the first user equipment. The access network device forwards the data to the second user equipment after receiving the data.

In a specific implementation process of this embodiment of the present disclosure, a better technical solution may be obtained by combing solutions in FIG. 3 and FIG. 4. More detailed descriptions are made below with reference to an accompanying drawing.

Figure 5:
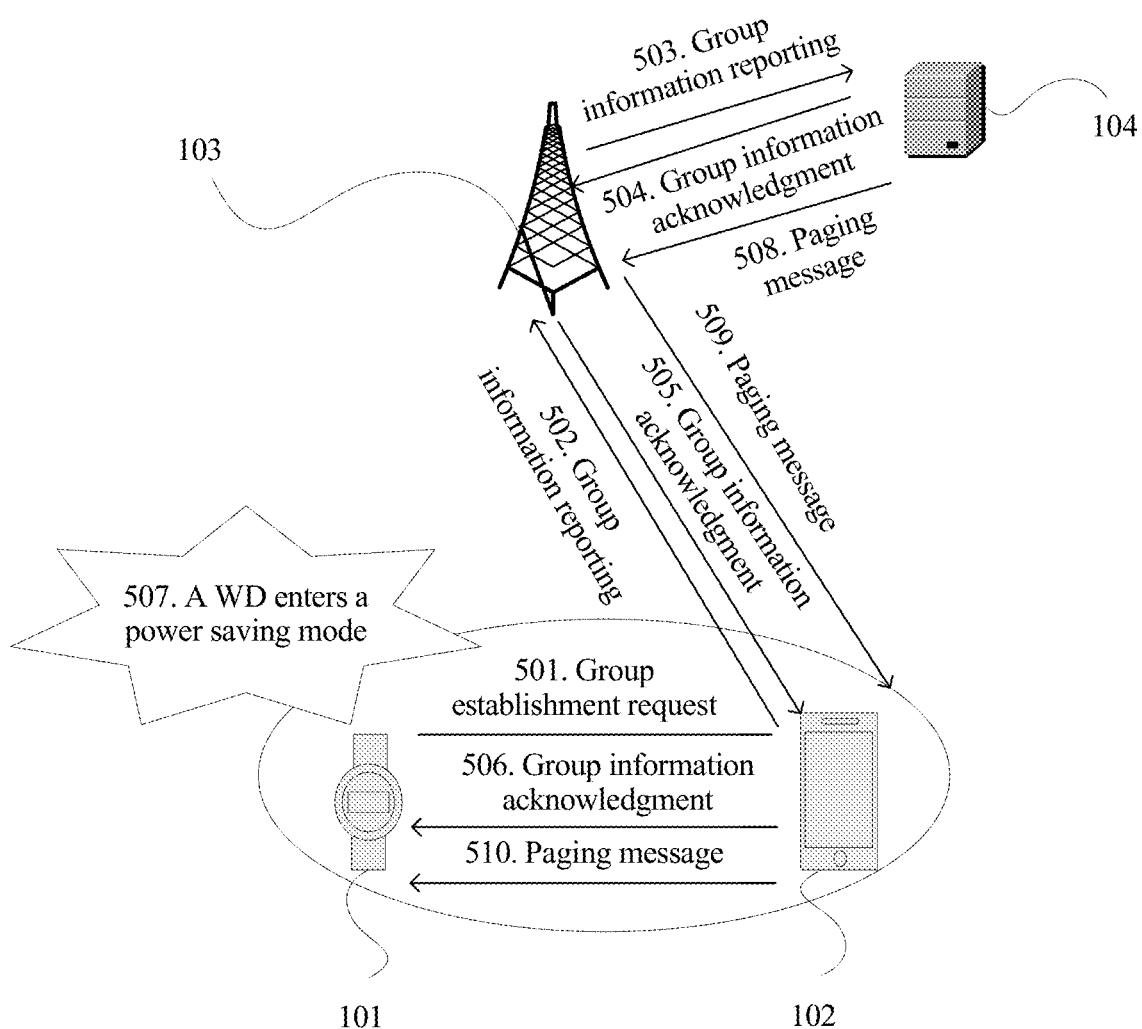
FIG. 5 is still another schematic communication diagram according to a method embodiment of the present disclosure.

FIG. 5 is still another schematic communication diagram according to a method embodiment of the present disclosure. The method may be applied to the communications system shown in FIG. 1. As shown in FIG. 5, the method may specifically include the following steps.

501. Establish a group between a WD and a UE. Specifically, the WD may send a group establishment request message to the UE when the WD needs to establish a group with the UE, or the UE may determine that the UE needs to establish a group with the WD.

502. When the UE receives the group establishment request message from the WD, or when the UE triggers a need to establish a group with the WD, the UE accesses an eNB, and sends a group establishment message to the eNB, to indicate that a group is established between the UE and the WD and indicate information about the established group, such as a number of the group.

503. After the eNB receives the group establishment message sent by the UE, the eNB may report, to an MME, information about the group established between the UE and the WD (such as a group ID (identifier) or IDs of the WD and the UE), to indicate, to the MME, the group established between the WD and the UE.

504. After the MME receives a group establishment message sent by the eNB, the MME sends a group information acknowledgment message to the eNB, to notify the eNB that the information about the group between the UE and the WD has been successfully stored.

505. The eNB further sends a group information acknowledgment message to the UE, to notify the UE that the information about the group between the WD and the UE has been stored on a network side.

It should be noted that in this embodiment of the present disclosure, there is no necessary sequence relationship between step 503, step 504, and step 505.

506. After the UE successfully obtains group establishment acknowledgment information from the network side, the UE sends group establishment acknowledgment information to the WD, to indicate that the group between the UE and the WD is successfully established.

507. After the WD determines that the group between the WD and the UE is successfully established, the WE enters a power saving mode, to reduce power consumption. That the WD enters the power saving mode means that the WD does not perform one or more of the following operations or stops performing one or more of the following operations:
 1. Cell search
 2. Cell measurement
 3. Cell selection/reselection
 4. Cell system information listening
 5. Cell paging message listening Further, in a moving process, the UE performs conventional cell measurement, cell selection and reselection, cell system information reception, and cell paging message reception. When the UE needs to perform cell reselection or after the UE performs cell reselection, the UE may notify the WD of information about a new reselected cell (for example, cell identifier information, cell frequency information, or cell system information). After receiving the information about the new cell, the WD stores the information for use when there is a subsequent need to communicate with the cell.

In addition, when the UE finds that system information of a cell on which the UE currently camps changes, the UE may send changed new system information to the WD. Alternatively, when the WD needs to establish a connection to a network for a service, the UE may notify the WD of information about and system information of a serving cell on which the UE currently camps. Specifically, when the WD needs to actively trigger a need to establish a connection to the network, the WD may need to request, from a UE side, information about and system information of a serving cell. Alternatively, when the WD passively triggers a need to establish a connection to the network, the UE sends information about and system information of a current serving cell to the WD.

Any short-range communication manner may be used for the foregoing information transfer between the UE and the WD.

508. A network sends a paging message to the UE when determining that the WD needs to be paged, where the paging message explicitly indicates that a paging object is the WD. Specifically, an implementation of indicating that the paging object is the WD may be explicitly indicating the ID of the WD, or indicating that the paging object is not the UE, or indicating whether the paging object is the WD, or the like.

509. After receiving a paging message sent by the MME, the eNB sends the paging message to the UE.

510. After receiving the paging message sent by the eNB, the UE determines whether the WD is to be paged, and if the WD is to be paged, the UE forwards the paging message to the WD, or sends a dedicated message to the WD to forward content of the paging message to the WD.

It should be noted that in this embodiment of the present disclosure, the MME may notify, by using dedicated signaling, the eNB that whether the paging object of the paging message is the WD, or the eNB may parse the paging message sent by the MME, to learn whether the paging object is the WD.

In a specific implementation process of an embodiment of the present disclosure, a group needs to be released in a particular condition. A potential meaning of group release is that a WD needs to independently execute a first task, or that a WD needs to be switched to a UE to execute a first task, or that a WD no longer needs to execute a first task. Group release is described below in detail with reference to an accompanying drawing.

Figure 6:
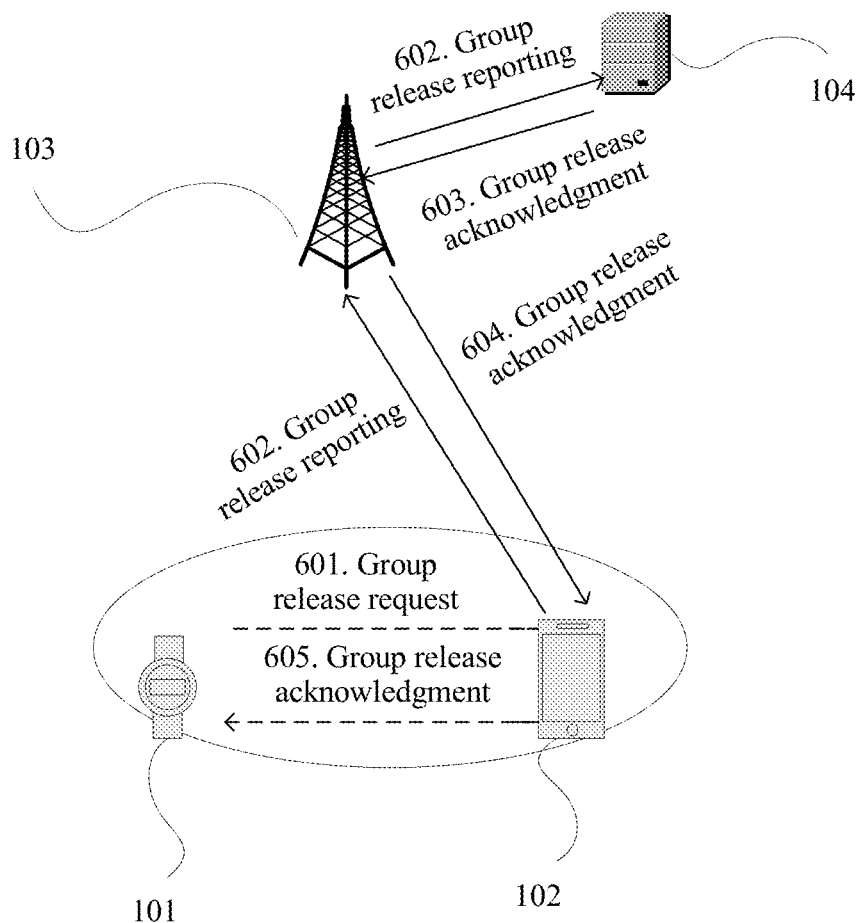
FIG. 6 is yet another schematic communication diagram according to a method embodiment of the present disclosure.

FIG. 6 is yet another schematic communication diagram according to a method embodiment of the present disclosure. The method may be applied to the communications system shown in FIG. 1. As shown in FIG. 6, the method may specifically include the following steps.

601. When a WD or a UE acknowledges that a group needs to be released, the UE reports group release indication information to a network.

Specifically, if the UE is currently in a connected mode, the UE may directly send the group release indication information to an eNB, to indicate that the group needs to be released. Alternatively, if the UE is currently in an idle mode, the UE is triggered to randomly access an eNB. Then in a random access process, for example, the UE adds the group release indication information to a random access message 3 and sends the group release indication information to the eNB, or the UE may send the group release indication information to the eNB after completing random access. Alternatively, if the UE is currently in an idle mode, the UE is triggered to perform a location update (TAU, Tracking Area Update) process, so as to report the group release indication information to a network side.

Herein, a determining condition for group release may be one or more of the following conditions:

1. The WD detects that quality of a signal between the WD and the UE is less than a specific threshold, and the WD and the UE no longer meet a group forming condition.

2. The UE detects that quality of a signal between the WD and the UE is less than a specific threshold, and the WD and the UE no longer meet a group forming condition.

3. The WD detects that a distance between the WD and the UE is less than a specific threshold, and the WD and the UE no longer meet a group forming condition.

4. The UE detects that a distance between the WD and the UE is less than a specific threshold, and the WD and the UE no longer meet a group forming condition.

5. The WD receives an indication that is of an application program and that requires releasing the group.

6. The UE receives an indication that is of an application program and that requires releasing the group.

7. The WD or the UE receives group release indication information sent by a network side device such as the eNB or an MME.

602. After receiving the group release indication information sent by the UE, an eNB sends a group release report message to an MME, to notify the MME that the group needs to be released.

603. The MME feeds back a group release acknowledgment message after receiving the group release report message sent by the eNB.

604. The eNB sends the group release acknowledgment message to the UE.

There is no necessary sequence relationship between step 604, step 602, and step 603.

605. After the UE determines that the network side has released the group, if short-range communication can still be performed between the WD and the UE, the UE sends a group release acknowledgment message to the WD, to acknowledge that the group has been released. Alternatively, if the WD chooses to enter a normal operation mode (that is, operations in all communication tasks need to be performed) after the group is released, a network side device such as the eNB may send a group release acknowledgment message to the WD.

606. After determining that the group between the WD and the UE is released, the WD may determine whether to continue to camp on a current serving cell, or to perform cell reselection to select another cell to camp on.

607. After the group is released, the WD may select the normal operation mode (that is, operations in all communication tasks need to be performed).

In addition, in this embodiment of the present disclosure, when reporting the group release indication information to the network side, the UE may report indication information indicating whether the WD and the UE are still in a same tracking area (Tracking Area, TA) currently, or report indication information indicating whether the WD and the UE are still in a same cell currently. Therefore, when the WD actively requests group release, the WD notifies the UE whether the WD continues to be in a same cell or a same tracking area TA as the UE.

Another case is described below.

When first user equipment establishes a connection to a network device, that is, in a data transmission process, the first user equipment may indirectly perform data transmission with the network device by using second user equipment. That is, the first user equipment sends, to the second user equipment, data that needs to be transmitted, and the second user equipment forwards the data to the network device. In order that the network device can distinguish whether data sent by the second user is data of the second user equipment or data of the first user equipment, a corresponding identifier may be added to a data packet that carries the data. Certainly, due to data privacy, the first user equipment may independently perform data transmission with the network device.

A process of data transmission between the first user equipment and the network device is usually accompanied by channel status measurement, radio resource management measurement, and the like. To save energy, the first user equipment may perform measurement in a communication process by using the second user equipment. A method may specifically include the following: The first user equipment establishes a connection to the network device, and the first user equipment executes a third task by using or with the assistance of the second user equipment. The third task is a task required for communication between the first user equipment and the network device. The third task includes at least one of the following: performing measurement according to measurement configuration information, sending a measurement result to the network device, or being handed over to a target cell or a target base station in a random access manner. Before executing the third task, the second user equipment needs to receive measurement configuration information sent by the network device. The measurement configuration information is used to execute the third task. Correspondingly, when determining that the second user equipment is to execute the third task, the network device needs to send the measurement configuration information to the second user equipment. An embodiment of the present disclosure is described below in detail with reference to an accompanying drawing.

Figure 7:
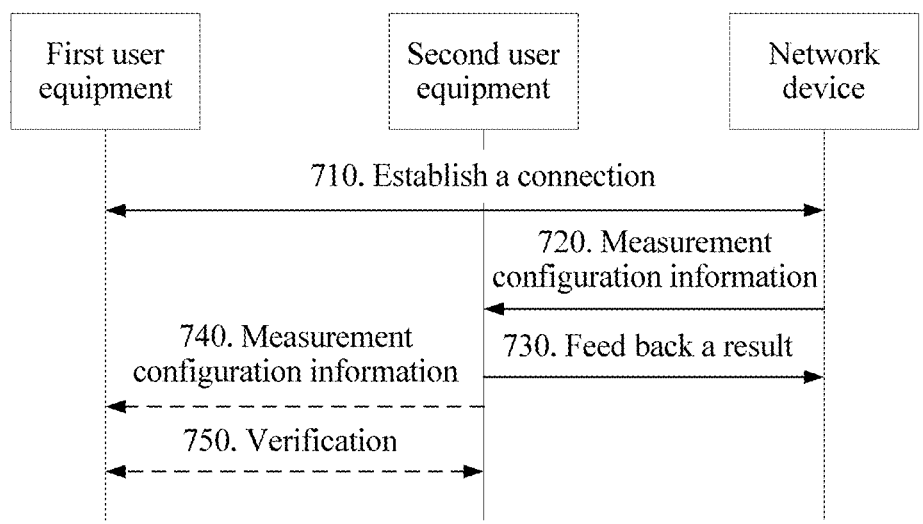
FIG. 7 is yet another schematic communication diagram according to a method embodiment of the present disclosure.

FIG. 7 is yet another schematic communication diagram according to a method embodiment of the present disclosure. The method may be applied to the communications system shown in FIG. 1. As shown in FIG. 7, the method may specifically include the following steps.

710. A first user equipment establishes a connection to a network device.

The first user equipment may obtain, by using a second user equipment, parameter information required for establishing the connection to a network device. For example, the parameter information includes uplink transmit power information or uplink transmit power adjustment information, uplink timing advance information or uplink advance adjustment information, and/or a configuration parameter. The configuration parameter herein means that devices at two ends can identify data only if the data is configured according to the configuration parameter in a transmission process. Alternatively, the first user equipment may independently obtain the information. The first user equipment establishes the connection to the network device by using the information.

When the first user equipment establishes the connection to the network device, the first user equipment may send indication information to the network device, to indicate that the first user equipment executes a third task by using the second user equipment. The third task may include performing measurement according to measurement configuration information, sending a measurement result to the network device, performing a process of being handed over to a target base station in a random access manner, and the like. The third task may be a task required in a process of data transmission between the first user equipment and the network device.

Alternatively, the network device may determine that a third task needs to be executed by using the second user equipment, and instruct the first user equipment to stop or skip executing the third task. In other words, the first user equipment executes a communication task other than the third task.

Alternatively, the second user equipment may determine that there is a need to execute a third task, and send a measurement configuration information request message to the network device, to request measurement configuration information. When sending the measurement configuration information request message to the network device, the second user equipment may specify that the second user equipment executes the third task in place of the first user equipment.

It should be noted that stopping or skipping executing the third task may mean that a rule may be defined, that is, the first user equipment does not need to execute the third task when communicating with the network device. In other words, the first user equipment is not responsible for the third task. However, the network device needs data obtained in the third task, and therefore the network device or the second user equipment determines to execute the third task independently. Alternatively, according to a communications protocol, the first user equipment needs to execute the third task. However, to save energy, the first user equipment does not execute the third task independently, but executes the third task by using the second user equipment. In this case, the first user equipment, the second user equipment, and the network device all may determine that the second user equipment executes the third task. Alternatively, according to a protocol, the first user equipment needs to execute the third task, and is executing the third task. The first user equipment stops executing the third task in a particular condition, for example, under an instruction from the second user equipment or the network device or under a command of an application program in the first user equipment. It should be noted that, the description of stopping or skipping executing the third task is merely intended for easier understanding, and does not constitute a limitation.

720. The network device sends configuration information to a second user equipment, where the network device may be an access network device or a core network device.

The measurement configuration information may be radio resource management RRM measurement configuration information and/or channel state indication information CSI measurement configuration information.

The measurement configuration information may further include first measurement configuration information and/or second measurement configuration information, the first measurement configuration information is configured by the network device for the first user equipment, and the second measurement configuration information is configured by the network device for the second user.

730. The second user equipment executes a third task according to the measurement configuration information.

The second user equipment receives the measurement configuration information sent by the network device, performs measurement according to the measurement configuration information, and sends a measurement result to the network device. The network device receives the measurement result.

The second user equipment may obtain a measurement result in the following manners.

Manner 1: When the configuration information sent by the network device and received by the second user equipment is classified into the first measurement configuration information and the second measurement configuration information, the second user equipment may separately perform measurement according to the two pieces of configuration information, and obtain a comprehensive measurement result.

For example, if a measurement configuration configured for a first UE is performing measurement for 2 ms at an interval of 10 ms, and a measurement configuration configured for a second UE is performing measurement for 3 ms at an interval of 10 ms, a measurement behavior of the second UE includes: performing measurement for 2 ms according to the measurement interval configured for the first UE, and then performing measurement for additional 1 ms. This is equivalent to completing measurement according to the measurement configuration for the second UE, because measurement is performed for 3 ms in total. In this case, when a measurement result is calculated, a value obtained by means of the measurement within 2 ms should be used as a measurement result of measurement performed by the first UE, for example, filtering is performed on values obtained by means of 2 ms-measurements. When a measurement result for the second UE is calculated, all values obtained by means of the measurement within 3 ms need to be used, for example, an average value of the values obtained within 3 ms is used as a final result.

Specifically, when CSI measurement is performed, one value may be obtained after one 2 ms-measurement or 3 ms-measurement is completed. However, for RRM measurement, values obtained after many 2 ms-measurements or 3 ms-measurements need to be measured, and then these values are averaged to obtain an RRM measurement result.

Manner 2: When the two pieces of configuration information are the same, the network device may indicate whether the first measurement configuration information can be used for the second user equipment or whether the second measurement configuration information can be used for the first user equipment, and the second user equipment performs measurement according to the indication, to obtain a measurement result.

Manner 3: The second user equipment may directly perform measurement according to the first measurement configuration information, to obtain a measurement result.

The part 720 and the part 730 mainly describe a process of executing the third task by the second user equipment.

After receiving the RRM measurement result, the network device determines that the first user equipment needs to be handed over to a cell. In this case, the network device sends, to the second user equipment, information about a target cell to which the first user equipment needs to be handed over and/or information about a target base station to which the first user equipment needs to be handed over. After receiving the information, the second user equipment is handed over to the target cell.

Based on different forms of cell handover, the network device may include a target access network device and a source access network device during handover. The target access network device and the source network device are separately described below in detail.

1. When handover is intra-access network device handover, that is, only cell handover is performed, the access network device sends, to the second user equipment, information about a target cell and other information required for the handover. The second user equipment is handed over to the target cell according to the information.

2. When handover is inter-access network device handover, that is, both cell handover and base station handover need to be performed, the source access network device sends, to the second user equipment, information about the target access network device, information about a target cell, and other information required for the handover. The second user equipment is handed over according to the information. In addition, in order that a target base station knows that the first user equipment executes the third task by using the second user equipment, the source access network device may notify the target base station of this case, or the second user equipment may notify the target base station of this case in a handover process or after handover is completed.

It should be noted that a cell handover process is described with more details in a related communications protocol, and for the cell handover process, refer to the communications protocol for understanding. Details are not described herein.

To improve reliability of the second user equipment in executing the third task, whether the measurement result of the second user equipment is accurate may be regularly verified. A specific process is as follows.

740. The second user equipment sends the configuration information to the first user equipment.

The configuration information is sent to the first user equipment to achieve the following objective: The first user equipment can independently execute the third task, or the first user equipment can perform measurement for the following verification, or the like.

750. Perform verification according to the configuration information.

There may be the following verification manners.

Manner 1: The second user equipment may send a measurement result to the first user equipment in an event triggering manner or at an interval of a particular period. After receiving the measurement result sent by the second user equipment, the first user equipment compares the measurement result with a measurement result obtained by the first user equipment by independently performing measurement in a same time period as the second user equipment, and when a difference between the two measurement results exceeds a specified threshold, the first user equipment cancels execution of the third task by the second user equipment.

Manner 2: The first user equipment may send a measurement result to the second user equipment in an event triggering manner or at an interval of a particular period. After receiving the measurement result sent by the first user equipment, the second user equipment compares the measurement result with a measurement result obtained by the second user equipment by performing measurement in a same time period as the first user equipment, and when a difference between the two measurement results exceeds a specified threshold, the second user equipment cancels execution of the third task, and notifies the first user equipment of this case or instructs the first user equipment to autonomously perform measurement.

Event triggering means that the second user equipment or the first user equipment detects that a channel state, a distance, or a location between the two user equipments does not meet a condition, or receives a trigger instruction from system software, or the like.

For clearer description, RRM measurement and CSI measurement are separately described below in detail with reference to accompanying drawings.

Figure 8:
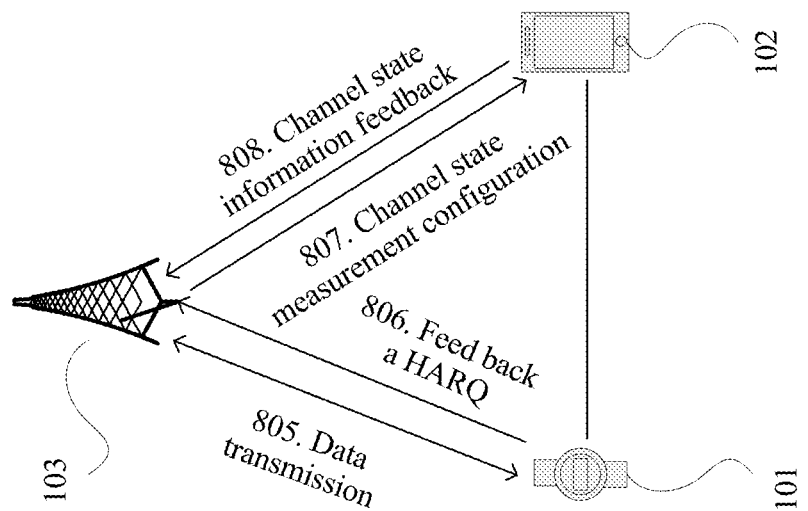
FIG. 8 is yet another schematic communication diagram according to a method embodiment of the present disclosure.
Figure 8:
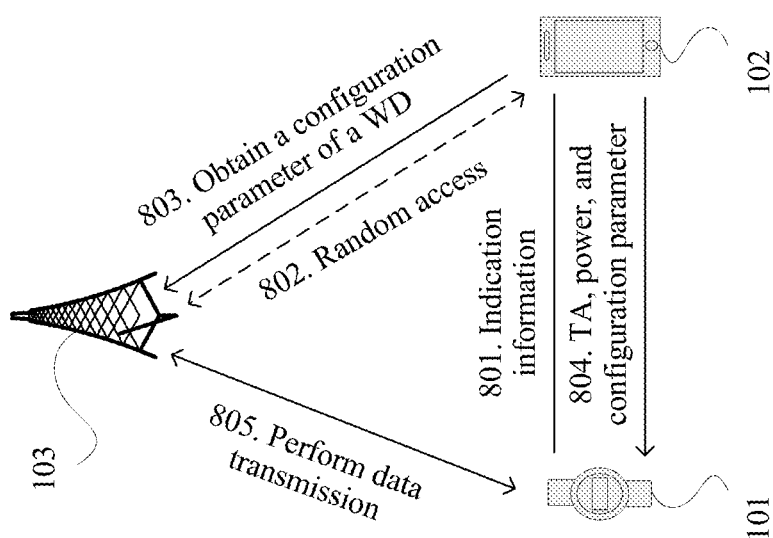

FIG. 8 is yet another schematic communication diagram according to a method embodiment of the present disclosure. The method may be applied to the communications system shown in FIG. 1. As shown in FIG. 8, the method may specifically include the following steps.

801. A WD may send an indication information to a UE when a network triggers the WD to establish a connection to the network to perform data transmission, or when the WD actively triggers a need to establish a connection to a network to perform data transmission, where a function of the indication information includes requesting the UE to obtain, for the WD, parameter information required for accessing the network, and the parameter information includes at least one piece of the following information:

1. Uplink timing advance (TA: timing advance) information or uplink advance adjustment information;

2. Uplink transmit power information or uplink transmit power adjustment information;

3. Configuration information, where the configuration information may include at least one of a physical layer configuration parameter, a MAC layer configuration parameter, an RLC layer configuration parameter, a PDCP layer configuration parameter, or an RRC configuration parameter.

802. After the UE learns that the WD needs to establish a connection to the network, or after the UE receives the indication information sent by the WD, if the UE is currently in a mode of connecting to an eNB, the UE transmits, to the WD, a TA value and uplink transmit power information or uplink transmit power adjustment information (for example, uplink transmit power information or uplink transmit power adjustment information of an uplink PUSCH channel) that are currently used; or if the UE is currently in an idle mode, the UE first establishes a connection to an eNB by using a random access process, and then transmits, to the WD, a TA value and uplink transmit power information or uplink transmit power adjustment information (for example, uplink transmit power information or uplink transmit power adjustment information of an uplink PUSCH channel) that are obtained.

803. In addition to uplink timing advance information or uplink advance adjustment information and transmit power, the UE may further first obtain, from the eNB, configuration information required by the WD, and then send the configuration information to the WD.

804. The UE sends, to the WD, the uplink timing advance information or the uplink advance adjustment information, uplink transmit power information or uplink transmit power adjustment information, and the configuration information that are required by the WD.

805. The WD establishes a connection to the eNB and performs data transmission by using the uplink timing advance information or the uplink advance adjustment information, the uplink transmit power information or the uplink transmit power adjustment information, and the configuration information that are obtained.

Specifically, after performing configuration for layers by using the configuration information, the WD starts to send uplink data to the eNB by using a TA value and the uplink transmit power information or the uplink transmit power adjustment information that are obtained, and receives downlink data sent by the eNB.

806. In a data transmission process, the WD listens to only scheduling information of a serving cell, and when receiving downlink data sent by the eNB, feeds back a HARQ for the downlink data.

807. In a process of data transmission performed between the WD and the eNB, the UE performs CSI measurement and feedback in place of the WD. Specifically, the eNB may configure, for the UE, measurement configuration information for performing CSI measurement by the UE in place of the WD; or the eNB may configure, in step 803 for the UE, configuration information for performing CSI measurement by the UE in place of the WD.

808. The UE feeds back a CSI measurement result according to the CSI measurement result.

In addition, to ensure accuracy of proxy measurement, the UE and the WD may irregularly perform a measurement calibration process in a proxy measurement process.

Specifically, the UE may send a CSI measurement result to the WD at an interval of a particular period. In addition, the WD may also perform CSI measurement at an interval of a particular period, and then compare the CSI measurement result sent by the UE with a CSI measurement result obtained by the WD by means of measurement. When a difference between the measurement results exceeds a specific threshold, cancellation of the proxy measurement process is triggered. When the WD needs to cancel the proxy measurement process, the WD may send proxy measurement cancellation indication information to the UE.

Alternatively, the WD may perform CSI measurement at an interval of a particular period, and send a CSI measurement result to the UE. Then, the UE triggers cancellation of the proxy measurement process when the UE determines, according to a measurement result in a same period, that a difference between the measurement results of the WD and the UE exceeds a specific threshold. When the proxy measurement process needs to be cancelled, the UE sends proxy measurement cancellation indication information to the WD, to instruct the WD to independently perform CSI measurement.

Figure 9:
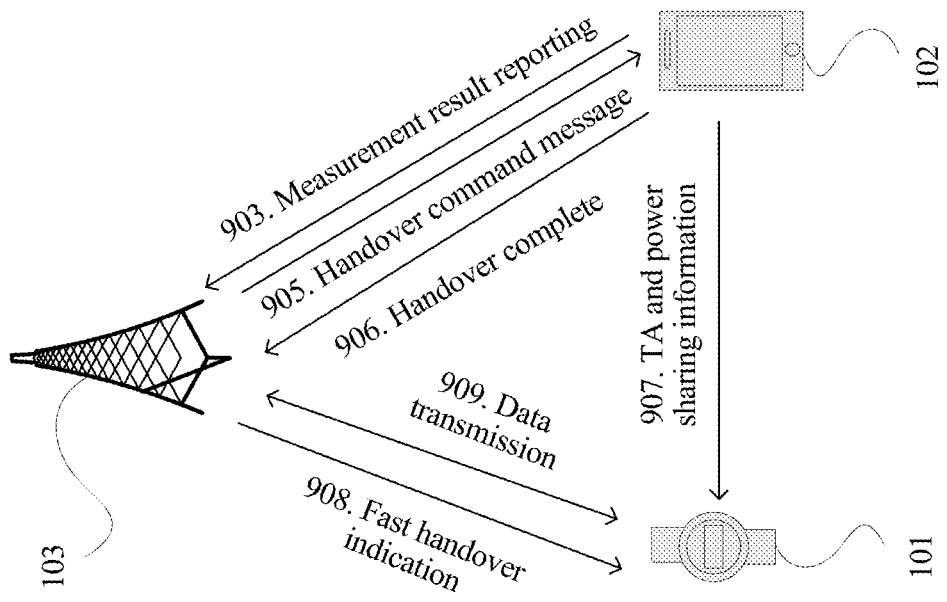
FIG. 9 is yet another schematic communication diagram according to a method embodiment of the present disclosure.
Figure 9:
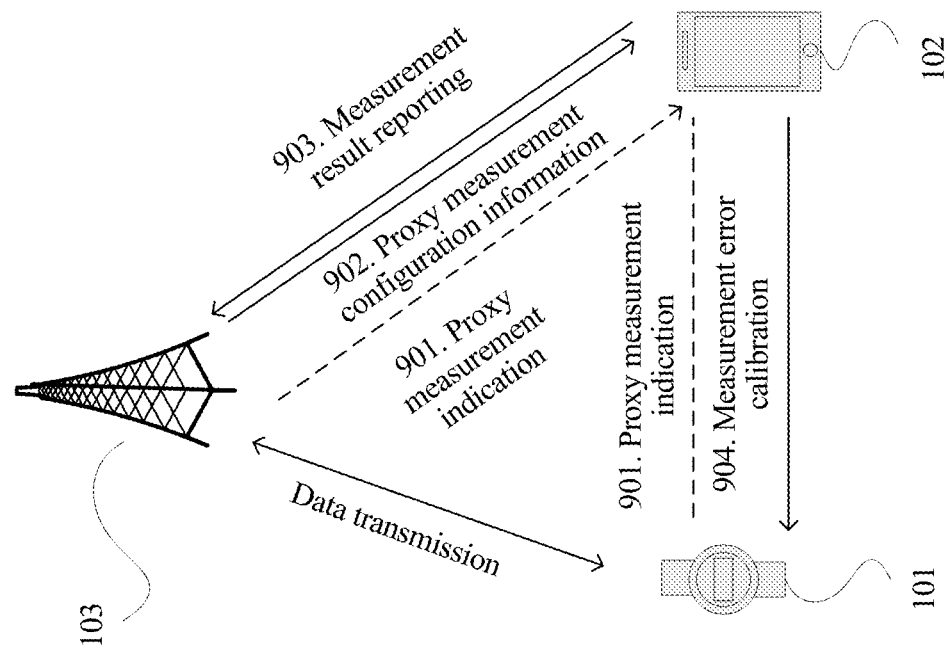

FIG. 9 is yet another schematic communication diagram according to a method embodiment of the present disclosure. The method may be applied to the communications system shown in FIG. 1. As shown in FIG. 9, the method may specifically include the following steps.

901. After a WD establishes data transmission with an eNB, to ensure service continuity and ensure that the WD can be handed over, in a moving process, to a proper target cell in a timely manner for operation, the WD or the eNB may request a UE to perform proxy RRM measurement for the WD, to reduce power consumption of the WD.

Specifically, the WD may send a request message to the UE, to request the UE to perform proxy RRM measurement for the WD; or the UE may actively perform proxy RRM measurement when determining that the WD needs to perform data transmission; or the eNB may instruct the UE to perform proxy RRM measurement in place of the WD.

902. The eNB configures, for the UE, measurement configuration information for performing proxy measurement.

903. The UE performs intra-frequency or inter-frequency RRM measurement according to the configuration information for proxy measurement, and reports a measurement result to the eNB.

904. In addition, to ensure accuracy of proxy measurement, the UE and the WD may irregularly perform a measurement calibration process in a proxy measurement process.

Specifically, the UE may send an RRM measurement result to the WD at an interval of a particular period. In addition, the WD may also perform RRM measurement at an interval of a particular period, and then compare the RRM measurement result sent by the UE with an RRM measurement result obtained by the WD by means of measurement. When a difference between the measurement results exceeds a specific threshold, cancellation of the proxy measurement process is triggered. When the WD needs to cancel the proxy measurement process, the WD may send proxy measurement cancellation indication information to the UE.

Alternatively, the WD may perform RRM measurement at an interval of a particular period, and send an RRM measurement result to the UE. Then, the UE triggers cancellation of the proxy measurement process when the UE determines, according to a measurement result in a same period, that a difference between the measurement results of the WD and the UE exceeds a specific threshold. When the proxy measurement process needs to be cancelled, the UE sends proxy measurement cancellation indication information to the WD, to instruct the WD to independently perform RRM measurement.

905. The UE performs proxy measurement and reports a measurement result, and the eNB sends a handover command message to the UE when determining, based on the measurement result, that handover needs to be performed, where the handover command message includes information about a target cell to which the UE needs to be handed over.

906. The UE is handed over to the target cell after receiving the handover command message sent by the eNB. Specifically, the UE needs to perform a random access process in the target cell, to obtain uplink timing advance information or an uplink advance adjustment information of the target cell, and uplink transmit power information or uplink transmit power adjustment information of the target cell. The UE sends a handover complete message to the target cell after successfully accessing the target cell.

In addition, in a process in which the UE is handed over to the target cell, the WD may continue to communicate with a source cell.

907. After the UE is successfully handed over, the UE notifies the WD of the information about the target cell to which the UE needs to be handed over, a TA value used in the target cell, and the uplink transmit power information or the uplink transmit power adjustment information used in the target cell. In addition, the UE may further notify the WD of parameter information at layers that is configured for the WD. Therefore, in a handover process, a target eNB needs to learn of information about a group between the UE and the WD. In order that the target eNB can learn of the information about the group between the UE and the WD, and configure a proper parameter for the WD, the following two manners may be used to notify the target eNB of the information about the group between the WD and the UE:

Manner 1: In a handover preparation phase, a source eNB sends the information about the group between the UE and the WD to the target eNB, so that the target eNB knows that the UE is actually handed over in place of the WD.

Manner 2: In a process of accessing the target eNB, or after being successfully handed over to the target eNB, the UE notifies the target eNB of the information about the group between the UE and the WD by using a message, so that the target eNB knows that the UE is actually handed over in place of the WD.

After the target eNB learns of a group relationship between the WD and the UE, the target eNB may configure, for the WD in a handover command, a configuration parameter required when the WD establishes a connection to the target eNB; or after the UE is successfully handed over, the target eNB configures, for the WD by using dedicated signaling, a configuration parameter required when the WD establishes a connection to the target eNB.

908. In addition, alternatively, after a source eNB learns that the UE successfully accesses the target eNB, the source eNB may directly send a fast handover command to the WD, to instruct the WD to access the target eNB to perform data transmission. Specifically, the source eNB may instruct, by using physical layer signaling or MAC signaling, the WD to be handed over.

909. After receiving a handover indication that indicates handover to the target cell or the target eNB and that is sent by the UE or the source eNB, the WE performs communication in the target cell by using the TA value and the uplink transmit power information or the uplink transmit power adjustment information that are provided by the UE.

In a specific implementation process of an embodiment of the present disclosure, when a first user equipment executes a task by using a second user equipment, a security mechanism may be configured for information security. The first user equipment establishes a connection to a network device. The first user equipment directly receives a security mode activation command sent by the network device. The first user equipment generates, according to security context information, an encryption key and an integrity protection key for data transmission on a control plane and/or an encryption key for data transmission on a user plane, and when performing data transmission with the network device, the first user equipment uses the generated encryption key and integrity protection key for data transmission on the control plane and/or the generated encryption key for data transmission on the user plane. The first user equipment receives a key update message sent by the second user equipment, and the key update message is sent by the network device to the second user equipment after the network device performs encryption and integrity protection on the key update message by using the encryption key and the integrity protection key. The first user equipment updates, according to the key update message, any one or more of the encryption key and the integrity protection key for data transmission on the control plane or the encryption key for data transmission on the user plane. By using this embodiment of the present disclosure, a security key between the first user equipment and the network device and a security key between the second user equipment and the network device may be independent of each other and invisible to each other, so as to ensure privacy of direct data transmission between the first user equipment and the network device. In addition, a key update process may be updated by using the second user equipment, so that energy consumption of the first user equipment is reduced, and a standby time is prolonged. The security mechanism provided in this embodiment of the present disclosure is described below in detail with reference to an accompanying drawing.

Figure 10:
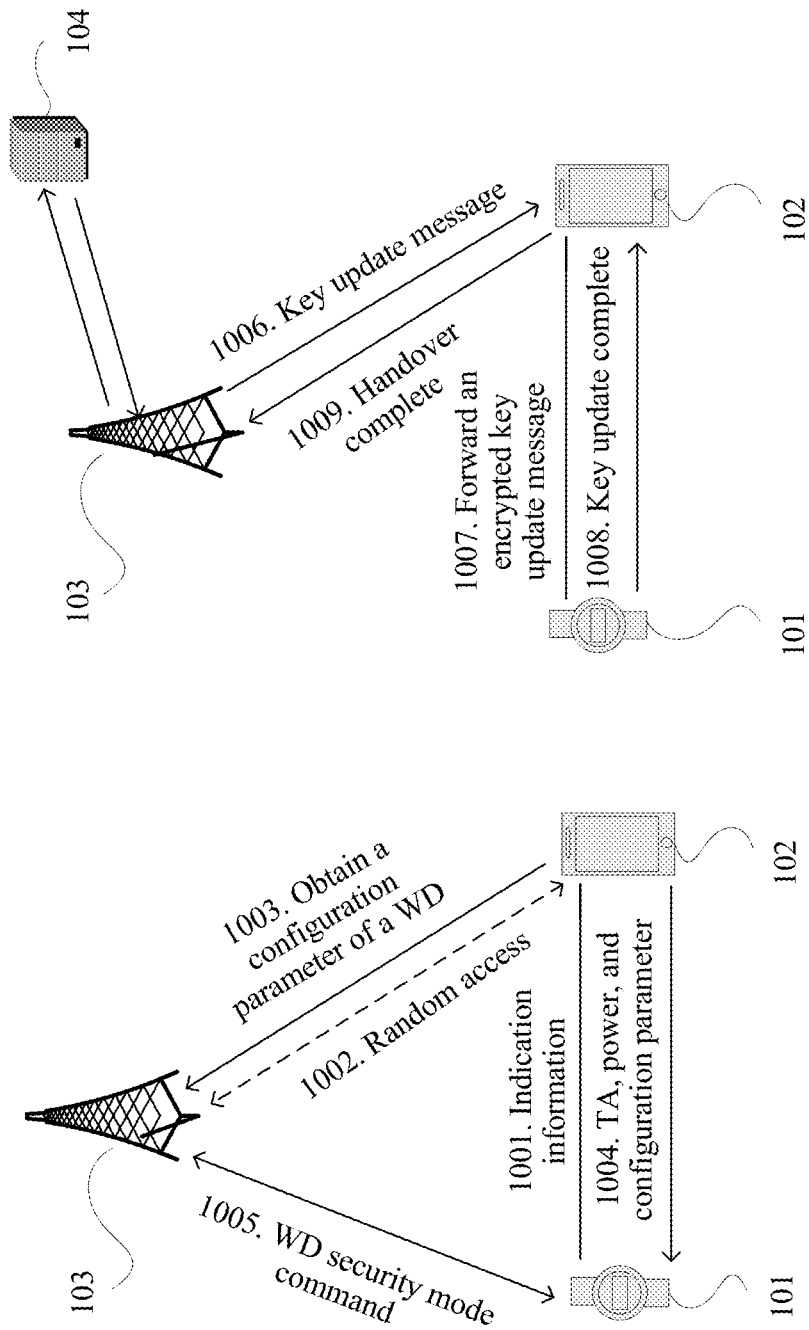
FIG. 10 is yet another schematic communication diagram according to a method embodiment of the present disclosure.

FIG. 10 is a yet another schematic communication diagram according to a method embodiment of the present disclosure. The method may be applied to the communications system shown in FIG. 1. As shown in FIG. 10, a main idea of this embodiment of the present disclosure is that when a first user equipment communicates with a network device, an initial key is transmitted only between the first user equipment and the network device, that is, only the first user equipment and the network device know the initial key. When the key needs to be updated, the network device may notify the first user equipment by using a second user equipment. The method may specifically include the following steps.

First, steps 1001 to 1004 are the same as steps 801 to 804 in FIG. 8. The method may further include the following steps.

1005. The eNB sends a security mode activation command to the WD, to activate a security key between the WD and the eNB. Specifically, after the WD receives the security mode activation command, the WD first generates KASME based on stored security context information, and then an eNB and the UE may generate a security key KeNB based on the generated KASME. After the KeNB is generated, the WD may derive, from the KeNB according to a security algorithm for the eNB, an encryption key and an integrity protection key for data transmission on a control plane and an encryption key for data transmission on a user plane.

For example, the WD generates a first key according to the security context information. The WD generates a second key according to one or more of the first key, NAS COUNT information (non-access stratum count information), an identifier of the network device, or an identifier of the UE. The WD calculates, from the second key according to a security algorithm for the network device, the encryption key and the integrity protection key for data transmission on the control plane and/or the encryption key for data transmission on the user plane; and when the first user equipment performs data transmission with the network device, encrypts or decrypts data on the control plane by using the encryption key, performs integrity protection on the data on the control plane by using the integrity protection key or verifies integrity of the data on the control plane by using the integrity protection key, and/or decrypts or encrypts data on the user plane by using the encryption key.

1006. Further, in a process of data transmission between the WD and the eNB, when a condition is met, the eNB needs to trigger performing of a key update process. A key update process of the WD is designed as follows:

When a key between the WD and the eNB needs to be updated, the eNB sends a dedicated message to the UE. The dedicated message includes related information for performing security key update by the WD, and encryption and/or integrity protection are/is performed on the dedicated message by using the current key between the WD and the eNB. Alternatively, the eNB may send an HO command message to the UE. The HO command message also includes related information for performing key update by the WE, and encryption and/or integrity protection are/is performed on the related information for key update by using the current key between the WD and the eNB.

1007. The UE forwards, to the WD, a key update message sent by the eNB to the UE.

1008. The WD generates a new encryption key and/or a new integrity protection key according to information carried in the key update message, and the WD sends a key update complete message to the UE after completing update.

1009. The UE sends a key update complete message to the eNB, to notify the eNB that the WD has completed key update.

The foregoing describes solutions provided in the embodiments of the present disclosure mainly from a perspective of interaction between network elements. It may be understood that, to implement the foregoing functions, each network element, such as the first user equipment, the second user equipment, the access network device, or the core network device includes corresponding hardware structures and/or software modules used to perform various functions. A person of ordinary skill in the art should be easily aware that, the units and algorithm steps in each example described with reference to the embodiments disclosed in this specification may be implemented in a form of hardware or a combination of hardware and computer software in the present disclosure. Whether the functions are implemented by hardware or are implemented in a manner in which computer software drives hardware depends on particular applications and design constraint requirements of the technical solutions. A person skilled in the art may use different methods to implement the described functions for each particular application, but it should not be considered that the implementation goes beyond the scope of the present disclosure.

Figure 11:
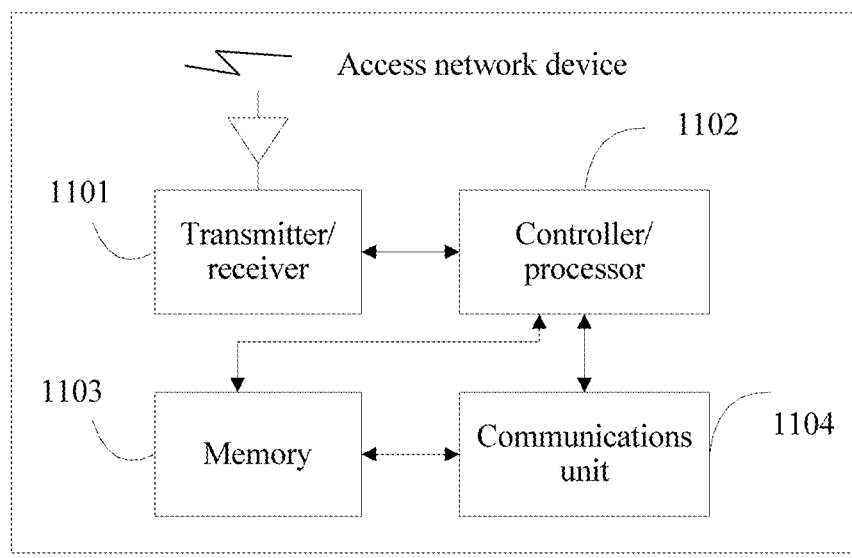
FIG. 11 is a schematic structural diagram of an access network device according to an apparatus embodiment of the present disclosure.

FIG. 11 is a possible schematic structural diagram of the access network device in the foregoing embodiment.

The access network device includes a transmitter/receiver 1101, a controller/processor 1102, a memory 1103, and a communications unit 1104. The transmitter/receiver 1101 is configured to: support the access network device in receiving/transmitting information from/to the UE in the foregoing embodiment, and support the UE in performing radio communication with other UE. The controller/processor 1102 performs various functions for communicating with the UE. In an uplink, an uplink signal from the UE is received by an antenna, demodulated by the receiver 1101, and further processed by the controller/processor 1102, so as to restore service data and signaling information that are sent by the UE. In a downlink, service data and a signaling message are processed by the controller/processor 1102, and demodulated by the transmitter 1101 to generate a downlink signal, and the downlink signal is transmitted by the antenna to the UE. The controller/processor 1102 further performs processing processes, in FIG. 3 to FIG. 10, that relate to the access network device and/or is configured to perform another process of the technology described in this application. The memory 1103 is configured to store program code and data that are of the access network device. The communications unit 1104 is configured to support the access network device in communicating with another network entity. For example, the communications unit 1104 is configured to support the access network device in communicating with another communications network entity shown in FIG. 2, such as an MME, an SGW, and/or a PGW in a core network EPC.

It may be understood that FIG. 11 shows only a simplified design of the access network device. In actual application, the access network device may include any quantity of transmitters, receivers, processors, controllers, memories, communications units, and the like, and all access network devices that can implement the present disclosure fall within the protection scope of the present disclosure.

Figure 12:
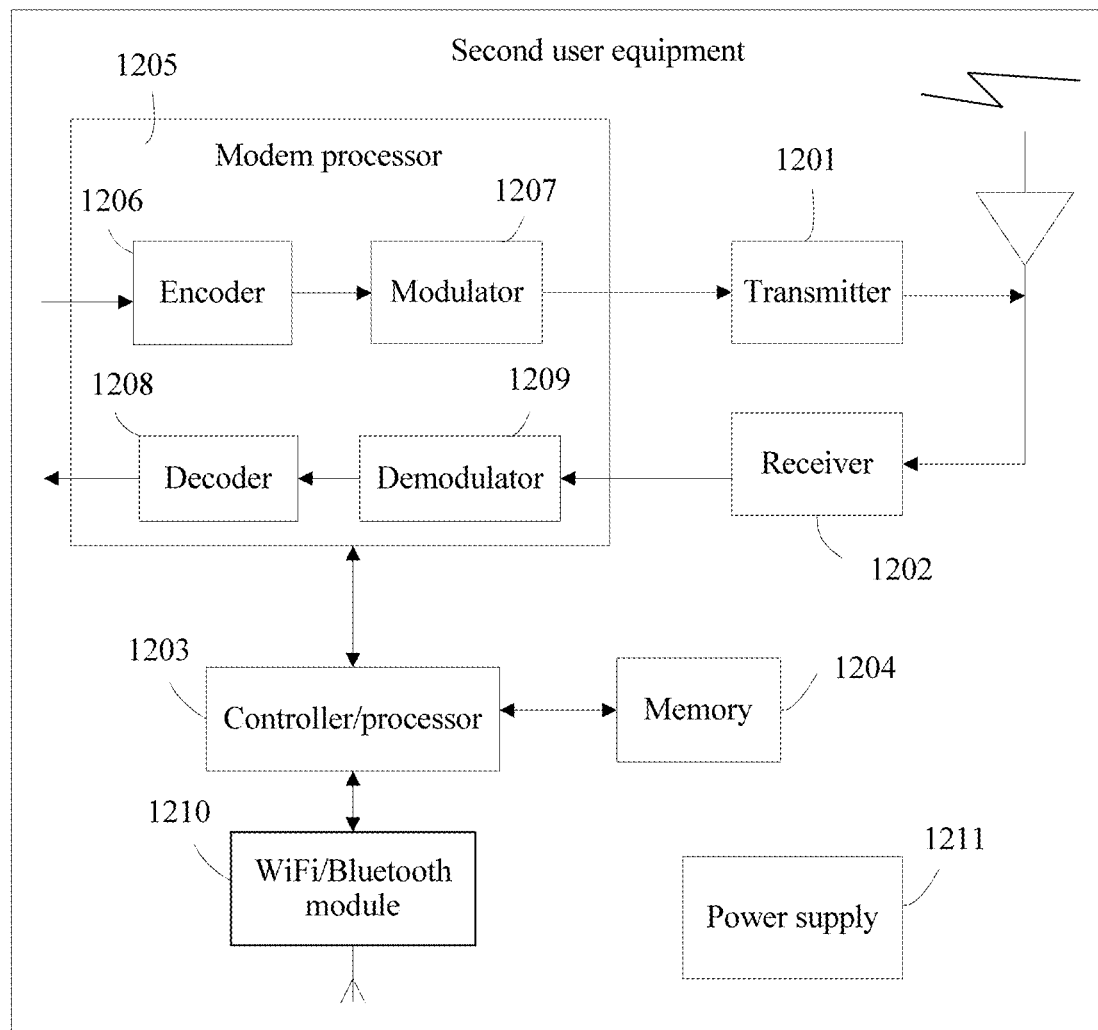
FIG. 12 is a schematic structural diagram of second user equipment according to an apparatus embodiment of the present disclosure.

FIG. 12 is a simplified schematic diagram of a possible design structure of the second user equipment in the foregoing embodiment. The second user equipment includes a transmitter 1201, a receiver 1202, a controller/processor 1203, a memory 1204, a modem processor 1205, a WiFi and/or Bluetooth module 1210, a power supply 1211, and the like.

The transmitter 1201 adjusts (for example, by means of analog conversion, filtering, amplification, and up-conversion) an output sample and generates an uplink signal. The uplink signal is transmitted to the access network device in the foregoing embodiment by an antenna. In a downlink, the antenna receives a downlink signal transmitted by the access network device in the foregoing embodiment. The receiver 1202 adjusts (for example, by means of filtering, amplification, down-conversion, and digitization) a signal received from the antenna and provides an input sample. In the modem processor 1205, an encoder 1206 receives service data and a signaling message that are to be sent in an uplink, and processes (for example, by means of formatting, coding, and interleaving) the service data and the signaling message. A modulator 1207 further processes (for example, by means of symbol mapping and modulation) service data and a signaling message that are encoded and provides an output sample. A demodulator 1209 processes (for example, by means of demodulation) the input sample and provides symbol estimation. A decoder 1208 processes (for example, by means of de-interleaving and decoding) the symbol estimation, and provides decoded data and a decoded signaling message that are sent to the second user equipment. The encoder 1206, the modulator 1207, the demodulator 1209, and the decoder 1208 may be implemented by the composite modem processor 1205. These units perform processing according to a radio access technology (such as an access technology in LTE or another evolved system) used by a radio access network.

The WiFi and/or Bluetooth module 1210 may include a WiFi and/or Bluetooth signal receiver and transmitter, and may perform, by using the receiver and the transmitter, data communication with another device such as the first user equipment that has a WiFi and/or Bluetooth function.

The power supply 1211 (such as a battery) is responsible for supplying power to each part. Preferably, the power supply may be logically connected to the controller/processor 1203 by using a power supply management system, so as to implement, by using the power supply management system, functions such as management of charging, discharging, and power consumption.

The controller/processor 1203 controls and manages an action of the second user equipment, and is configured to perform processing performed by the second user equipment in the foregoing embodiment. For example, the controller/processor 1203 is configured to control the user equipment to execute a first task and/or another process of the technology described in the present disclosure. For example, the controller/processor 1203 is further configured to perform processing processes, in FIG. 3 to FIG. 10, that relate to the second user equipment and/or perform another process of the technology described in this application. The memory 1204 is configured to store program code and data that are used for the second user equipment.

Figure 13:
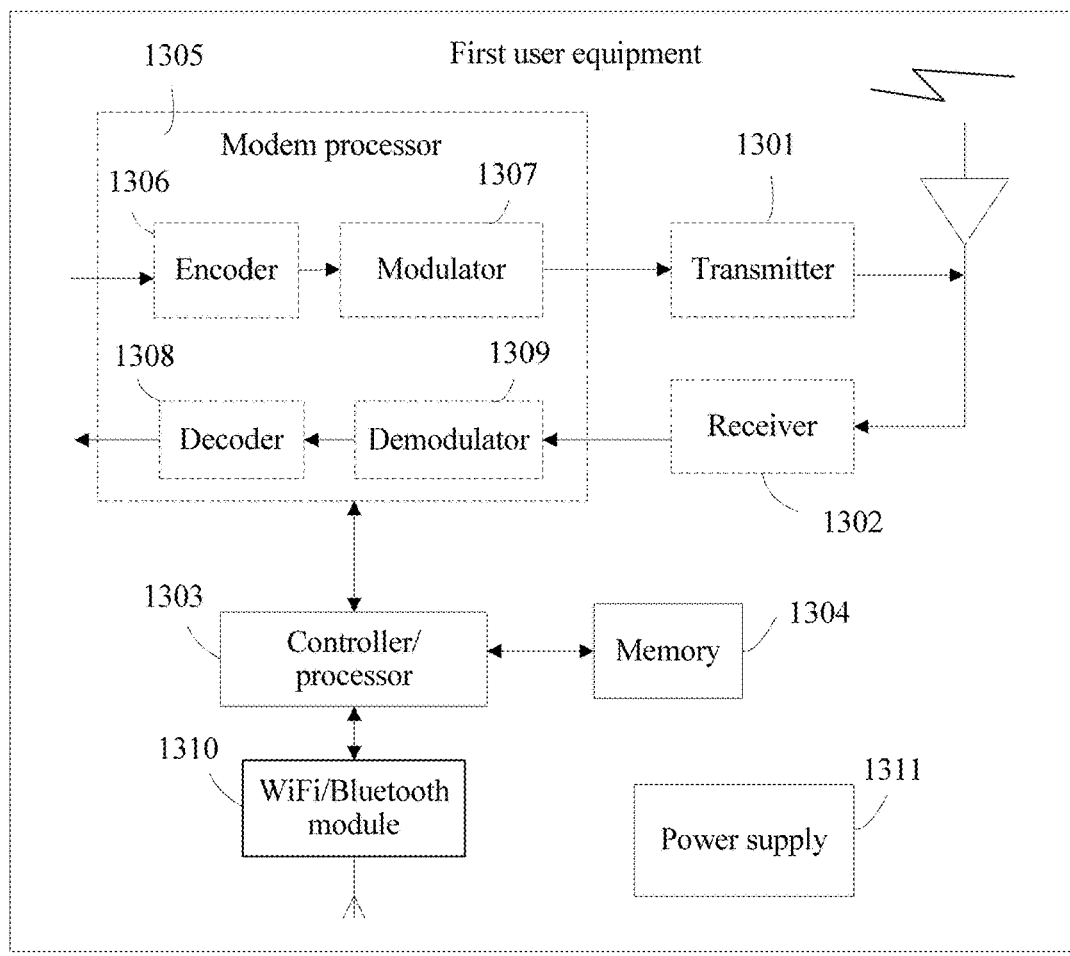
FIG. 13 is a schematic structural diagram of first user equipment according to an apparatus embodiment of the present disclosure.

FIG. 13 is a simplified schematic diagram of a possible design structure of the first user equipment in the foregoing embodiment. The first user equipment may include a transmitter 1301, a receiver 1302, a controller/processor 1303, a memory 1304, a modem processor 1305, a WiFi and/or Bluetooth module 1310, a power supply 1311, and the like.

The transmitter 1301 adjusts (for example, by means of analog conversion, filtering, amplification, and up-conversion) an output sample and generates an uplink signal. The uplink signal is transmitted to the base station in the foregoing embodiment by an antenna. In a downlink, the antenna receives a downlink signal transmitted by the base station in the foregoing embodiment. The receiver 1302 adjusts (for example, by means of filtering, amplification, down-conversion, and digitization) a signal received from the antenna and provides an input sample. In the modem processor 1305, an encoder 1306 receives service data and a signaling message that are to be sent in an uplink, and processes (for example, by means of formatting, coding, and interleaving) the service data and the signaling message. A modulator 1307 further processes (for example, by means of symbol mapping and modulation) service data and a signaling message that are encoded and provides an output sample. A demodulator 1309 processes (for example, by means of demodulation) the input sample and provides symbol estimation. A decoder 1308 processes (for example, by means of de-interleaving and decoding) the symbol estimation, and provides decoded data and a decoded signaling message that are sent to the first user equipment. The encoder 1306, the modulator 1307, the demodulator 1309, and the decoder 1308 may be implemented by the composite modem processor 1305. These units perform processing according to a radio access technology (such as an access technology in LTE or another evolved system) used by a radio access network.

The WiFi and/or Bluetooth module 1310 may include a WiFi and/or Bluetooth signal receiver and transmitter, and may perform, by using the receiver and the transmitter, data communication with another device such as the second user equipment that has a WiFi and/or Bluetooth function.

In this embodiment of the present disclosure, if tasks of direct interaction with a network device are all executed by the second user equipment, the first user equipment may not include the transmitter 1301, the receiver 1302, the modem processor 1305, and internal components of the modem processor 1305.

The power supply 1311 (such as a battery) is responsible for supplying power to each part. Preferably, the power supply may be logically connected to the controller/processor 1303 by using a power supply management system, so as to implement, by using the power supply management system, functions such as management of charging, discharging, and power consumption.

The controller/processor 1303 controls and manages an action of the first user equipment, and is configured to perform processing performed by the first user equipment in the foregoing embodiment. For example, the controller/processor 1303 is configured to control the user equipment to execute a second task and/or another process of the technology described in the present disclosure. For example, the controller/processor 1303 is further configured to perform processing processes, in FIG. 3 to FIG. 10, that relate to the first user equipment and/or perform another process of the technology described in this application. The memory 1304 is configured to store program code and data that are used for the first user equipment.

Figure 14:
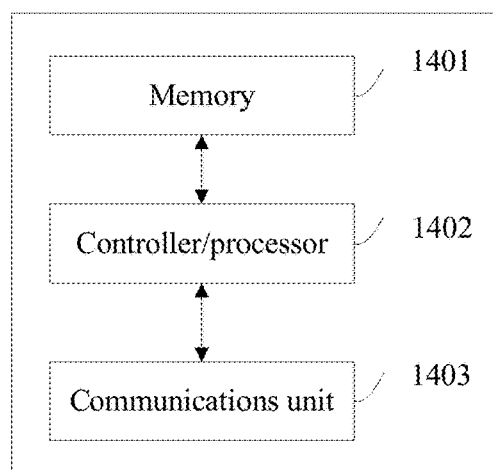
FIG. 14 is a block diagram of a design of a core network device according to an apparatus embodiment of the present disclosure.

FIG. 14 is a block diagram of a design of the core network device in the foregoing embodiment. The core network device may be an EPC network, and the core device apparatus may be an MME, an SGW, a PGW, or a combination thereof.

The core network device includes: a controller/processor 1402, configured to: control and manage an action of the core network device, and perform various functions to support a communication service of a UE. For example, the controller/processor 1402 is configured to support the core network device in performing processing processes, in FIG. 3 to FIG. 10, that relate to a network device and the core network device and/or performing another process of the technology described in this specification. A memory 1401 is configured to store program code and data that are used for the core network device. A communications unit 1403 is configured to support communication with another network entity, for example, communication with the communications unit 1104 in the access network device in FIG. 11, communication with the second user equipment in FIG. 12, and/or communication with the first user equipment in FIG. 13. For another example, the communications unit 1403 supports communication with a network entity shown in FIG. 2.

The controller/processor configured to perform functions of the access network device, the user equipment, or the core network device in the present disclosure may be a central processing unit (CPU), a general purpose processor, a digital signal processor (DSP), an application-specific integrated circuit (ASIC), a field programmable gate array (FPGA) or another programmable logical device, a transistor logical device, a hardware component, or any combination thereof. The controller/processor may implement or execute various example logical blocks, modules, and circuits described with reference to content disclosed in the present disclosure. Alternatively, the processor may be a combination of processors implementing a computing function, for example, a combination of one or more microprocessors, or a combination of a DSP and a microprocessor.

It should be noted that, the descriptions of "first", "second", "third", and the like are merely intended to be more distinguishable and do not constitute limitations on the nouns.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementations, the objective, technical solutions, and benefits of the present disclosure are further described in detail. It should be understood that the foregoing descriptions are merely specific implementations of the present disclosure, but are not intended to limit the protection scope of the present disclosure. Any modification, equivalent replacement, or improvement made without departing from the spirit and principle of the present disclosure should fall within the protection scope of the present disclosure.

What is claimed is:

1. A user equipment, wherein the user equipment is a first user equipment and comprises:
    a processor, configured to obtain a first result by causing a first task to be executed by a second user equipment, wherein the first task comprises cell paging message listening or cell paging message reception, wherein the first result is used for communication with a network device, wherein the first result comprises paging information; and
    a receiver, configured to receive the first result from the second user equipment, wherein the first result comprises a paging message received from the second user equipment, wherein a paging object of the paging message is the first user equipment;
    wherein the processor is further configured to:
        communicate with the network device based on the first result; and
        determine to release a group of user equipments in response to determining that a preset condition is met.

2. The user equipment according to claim 1, wherein the first task further comprises one or more of the following tasks:
    cell search, cell measurement, cell selection, cell reselection, cell system information listening, determining uplink transmit power information or uplink transmit power adjustment information used in a serving cell, determining uplink timing advance information or uplink advance adjustment information used in a serving cell, determining a tracking area, or determining to update a tracking area.

3. The user equipment according to claim 1, wherein the processor is further configured to execute a second task, wherein the second task comprises one or more tasks other than the first task from the following tasks:
    cell search, cell measurement, cell selection, cell reselection, cell system information change listening, cell system information reception, cell paging message listening, cell paging message reception, determining uplink transmit power information or uplink transmit power adjustment information used in a serving cell, determining uplink timing advance information or uplink advance adjustment information used in a serving cell, determining a tracking area, and determining to update a tracking area.

4. The user equipment according to claim 1, wherein the receiver is further configured to:
    receive a service notification message sent by the second user equipment, wherein the service notification message is determined by the second user equipment according to a received paging message sent by the network device.

5. The user equipment according to claim 1, wherein determining that the preset condition is met comprises:
    determining a quality of a signal or a distance between the first user equipment and the second user equipment reaches a threshold; or
    determining the first user equipment receives group release indication information sent by the second user equipment or the network device; or
    determining the first user equipment receives group release indication information by using a man-machine interface or from an application layer.

6. A user equipment, wherein the user equipment is second user equipment and comprises:
    a processor, configured to execute a first task to obtain a first result for communication with a network device, wherein the first result comprises at least one of the following information:
        paging information, information about a cell to be camped on or a serving cell, a serving cell measurement result, a neighboring cell measurement result, system information or updated system information of a cell to be camped on or a serving cell, information about a cell to be camped on or a serving cell that is obtained after cell selection or cell reselection, uplink transmit power information or uplink transmit power adjustment information of a serving cell, or uplink timing advance information or uplink advance adjustment information of a serving cell; and
    a transmitter, configured to send the first result to a first user equipment, so that the first user equipment communicates with the network device based on the first result;
    wherein the processor is further configured to establish a group between the first user equipment and the second user equipment, wherein the group indicates that the first user equipment and the second user equipment share at least one piece of information used for communication with the network device;
    wherein the transmitter is further configured to send a group establishment acknowledgment message to the first user equipment, to indicate that the group is established between the first user equipment and the second user equipment;
    wherein the processor is further configured to release, by the second user equipment, the group in response to determining that a preset condition is met, wherein determining that the preset condition is met comprises: determining the second user equipment receives group release indication information sent by the first user equipment or the network device, or determining the second user equipment receives group release indication information by using a man-machine interface or from an application layer;
    wherein the transmitter is further configured to send group release indication information to the network device, wherein the group release indication information is used to instruct to release the group between the first user equipment and the second user equipment;

wherein the processor is further configured to perform a process of randomly accessing the network device or a location update process; and wherein the transmitter is further configured to send the group release indication information to the network device in the random access process or the location update process.

7. The user equipment according to claim 6, wherein the processor is further configured to perform at least one of the following:

performing cell measurement, and obtaining one or more of a serving cell measurement result and a neighboring cell measurement result; or performing cell selection or cell reselection, and determining information about a selected or reselected cell; or listening to system information of a cell to be camped on or a serving cell, and determining changed system information of the cell to be camped on or the serving cell when the system information of the cell to be camped on or the serving cell changes; or listening to a paging message, and determining that a paging message whose paging object is the first user equipment is obtained by means of listening;

and wherein the transmitter is further configured to send a fourth request message to the network device, wherein the fourth request message is used to obtain parameter information used for a service provided by the network device;

and wherein the user equipment further comprises: a receiver, configured to receive a first response message sent by the network device, wherein the first response message comprises the parameter information, the parameter information comprises at least one of: uplink transmit power information or uplink transmit power adjustment information, uplink timing advance information or uplink advance adjustment information, or a configuration parameter, and the configuration parameter comprises at least one of the following parameters: a physical layer configuration parameter, a media access control (MAC) layer configuration parameter, a radio link control (RLC) layer configuration parameter, a Packet Data Convergence Protocol (PDCP) layer configuration parameter, or a radio resource control (RRC) configuration parameter.

8. The user equipment according to claim 6, further comprising:

a receiver, configured to receive a first request message sent by the first user equipment, wherein the first request message is used to request the first result.

9. The user equipment according to claim 7, wherein the receiver is further configured to receive a paging message sent by the network device, wherein the paging message comprises at least one of:
the group information of the group,
the identifier of the first user equipment,
the identifier of the first user equipment and an indication indicating whether to perform a group operation,
the identifier of the first user equipment and an indication indicating whether to forward the paging message to the first user equipment, or
the identifier of the first user equipment and the identifier of the second user equipment.

10. The user equipment according to claim 7, wherein the transmitter is further configured to:

forward the paging message to the first user equipment, or
send a part or all of content of the paging message to the first user equipment, or
send a service notification message to the first user equipment, wherein the service notification message is determined by the second user equipment according to the received paging message sent by the network device.

11. A user equipment, wherein the user equipment is first user equipment and comprises:

a transmitter; and a processor, configured to:

establish a connection to a network device; and cause a second user equipment to execute a third task, wherein the third task is a task used for communication between the first user equipment and the network device, and the third task comprises at least one of the following: performing measurement according to measurement configuration information, sending a measurement result to the network device, or being handed over to a target cell or a target base station in a random access manner;

wherein the processor is further configured to execute a fourth task, wherein executing the fourth task comprises at least one of the following:

directly sending scheduling request signaling to the network device, directly receiving secure activation-related signaling from the network device, directly sending secure activation-related signaling to the network device, or directly feeding back channel state indication information (CSI) measurement result information to the network device;

wherein the processor is further configured to execute the fourth task to obtain a second result, wherein the second result comprises that the first user equipment determines that processing of the downlink control signaling or processing of the secure activation-related signaling is correctly completed; and wherein the transmitter is further configured to directly feed back, to the network device, feedback information indicating whether processing of the downlink control signaling is completed.

12. The user equipment according to claim 11, further comprising:

a receiver configured to receive handover information sent by the second user equipment, wherein the handover information comprises one or more of: information about the target cell, uplink timing advance information or uplink advance adjustment information used in the target cell, and/or uplink transmit power information or uplink transmit power adjustment information used in the target cell;

wherein the processor is further configured to communicate with the network device by using the handover information.

13. The user equipment according to claim 11, wherein:

the processor is further configured to execute the fourth task to obtain a second result, wherein the second result comprises HARQ information obtained by the first user equipment by decoding the downlink data or the downlink control signaling, and the HARQ information is information indicating whether the downlink data is correctly decoded; and the transmitter is further configured to directly feed back the HARQ information to the network device.

* * * * *